March 27, 1934.　　　F. E. BESSLER　　　1,953,038

HOUSEHOLD APPLIANCE

Filed Dec. 24, 1931　　　16 Sheets-Sheet 1

INVENTOR
Frank E. Bessler
BY
Ely & Barrow
ATTORNEYS

March 27, 1934.　　　F. E. BESSLER　　　1,953,038
HOUSEHOLD APPLIANCE
Filed Dec. 24, 1931　　　16 Sheets-Sheet 2
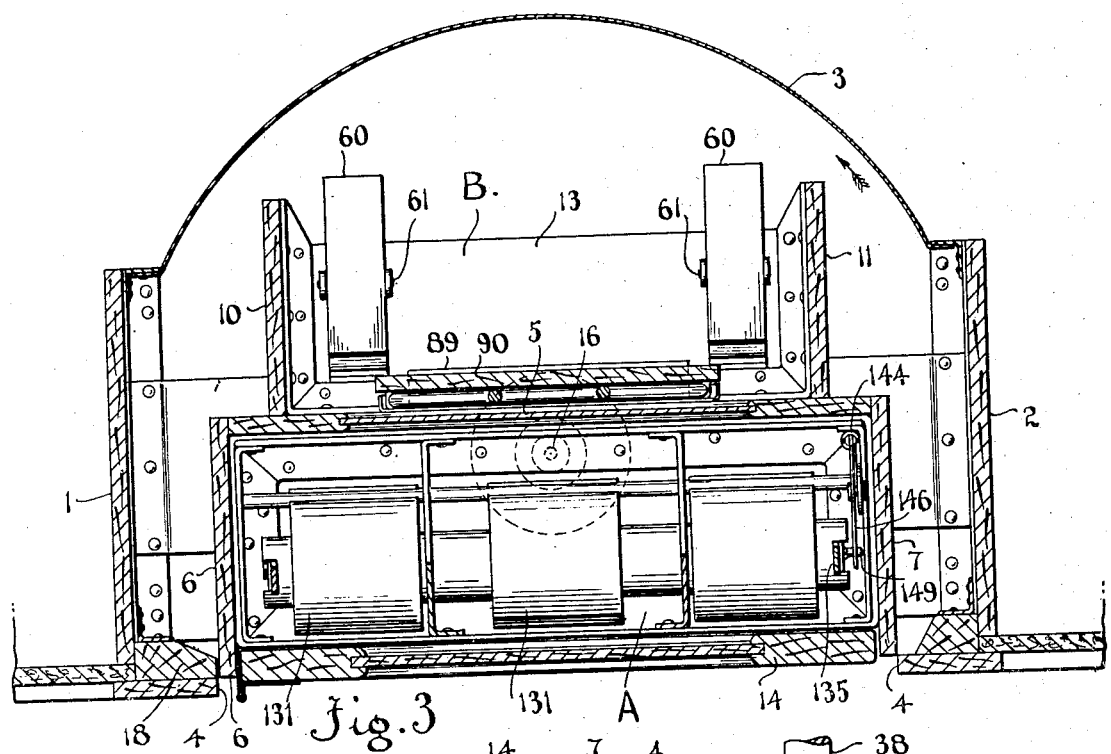
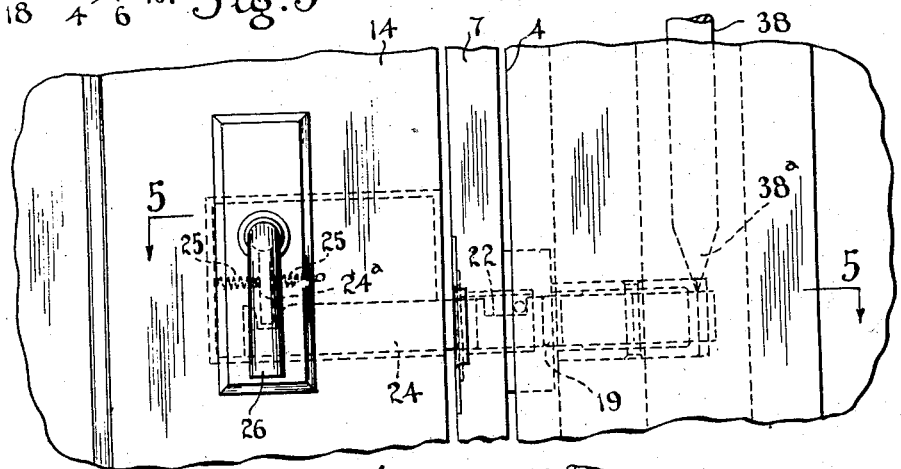
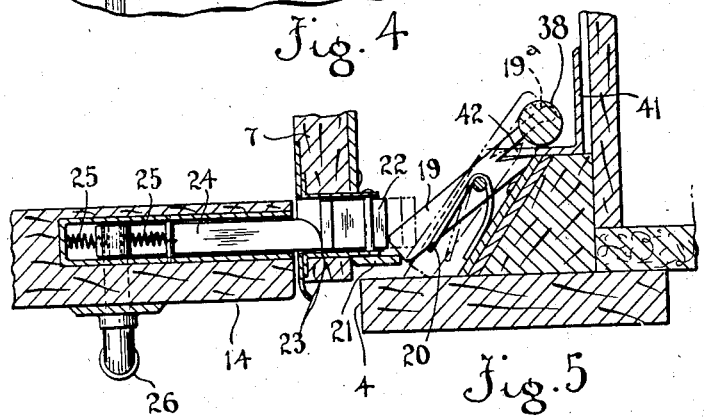
INVENTOR
Frank E. Bessler
ATTORNEYS March 27, 1934.  F. E. BESSLER  1,953,038
HOUSEHOLD APPLIANCE
Filed Dec. 24, 1931  16 Sheets-Sheet 3

INVENTOR
Frank E. Bessler
BY Ely & Barrow
ATTORNEYS

March 27, 1934.　　　F. E. BESSLER　　　1,953,038
HOUSEHOLD APPLIANCE
Filed Dec. 24, 1931　　　16 Sheets-Sheet 4

INVENTOR
Frank E. Bessler
Ely & Barrow
ATTORNEYS

March 27, 1934.　　　F. E. BESSLER　　　1,953,038
HOUSEHOLD APPLIANCE
Filed Dec. 24, 1931　　　16 Sheets-Sheet 5

INVENTOR
Frank E. Bessler
BY
Ely & Barrow
ATTORNEYS

March 27, 1934.　　　F. E. BESSLER　　　1,953,038
HOUSEHOLD APPLIANCE
Filed Dec. 24, 1931　　　16 Sheets-Sheet 6

INVENTOR
Frank E. Bessler
BY
ATTORNEYS

March 27, 1934. F. E. BESSLER 1,953,038
HOUSEHOLD APPLIANCE
Filed Dec. 24, 1931 16 Sheets-Sheet 7
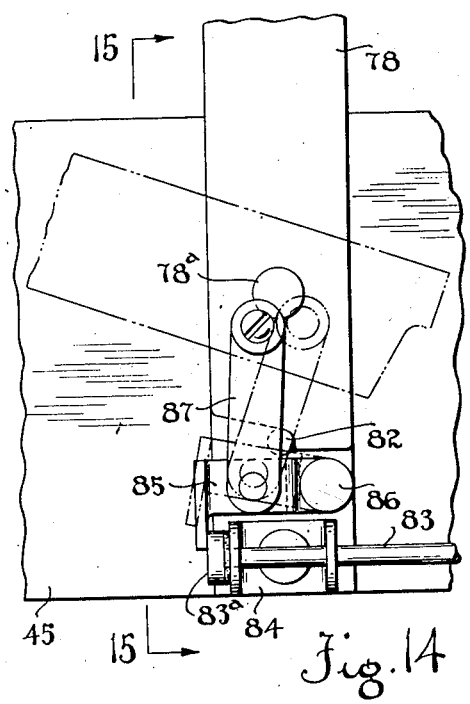
Fig. 14
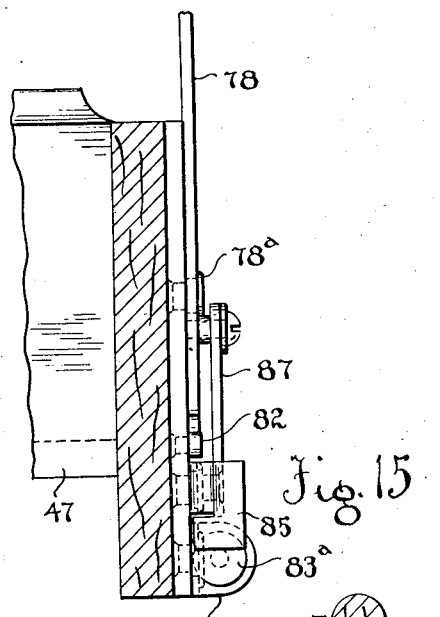
Fig. 15
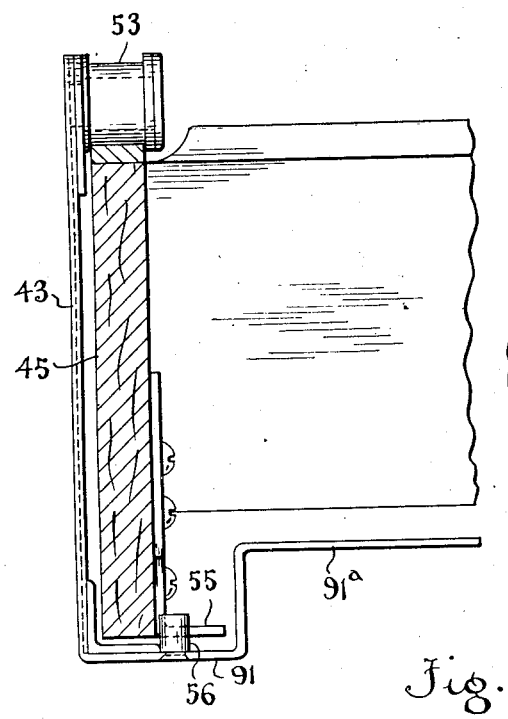
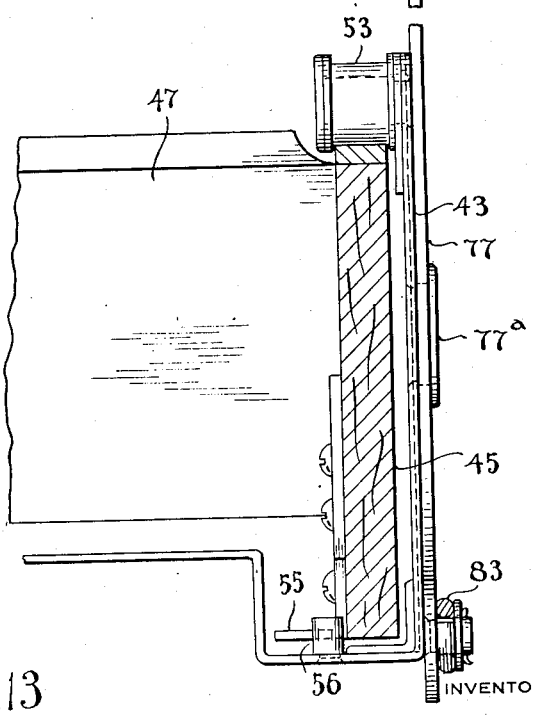
Fig. 13
INVENTOR
Frank E. Bessler
BY
Ely & Barrow
ATTORNEYS

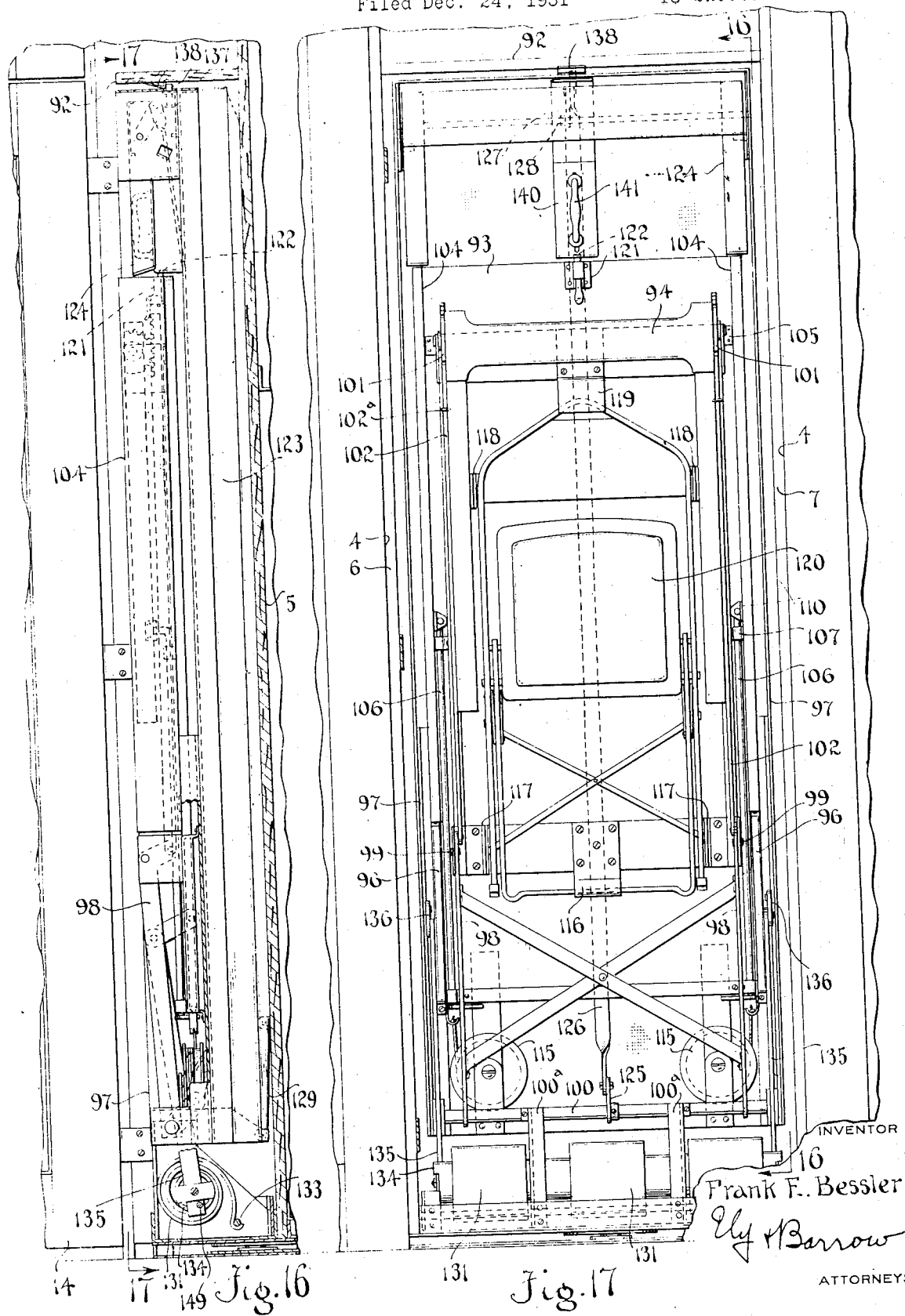

March 27, 1934.  F. E. BESSLER  1,953,038
HOUSEHOLD APPLIANCE
Filed Dec. 24, 1931  16 Sheets-Sheet 9

INVENTOR
Frank E. Bessler
BY
Ely + Barrow
ATTORNEYS

INVENTOR
Frank E. Bessler

March 27, 1934.    F. E. BESSLER    1,953,038
HOUSEHOLD APPLIANCE
Filed Dec. 24, 1931    16 Sheets-Sheet 11
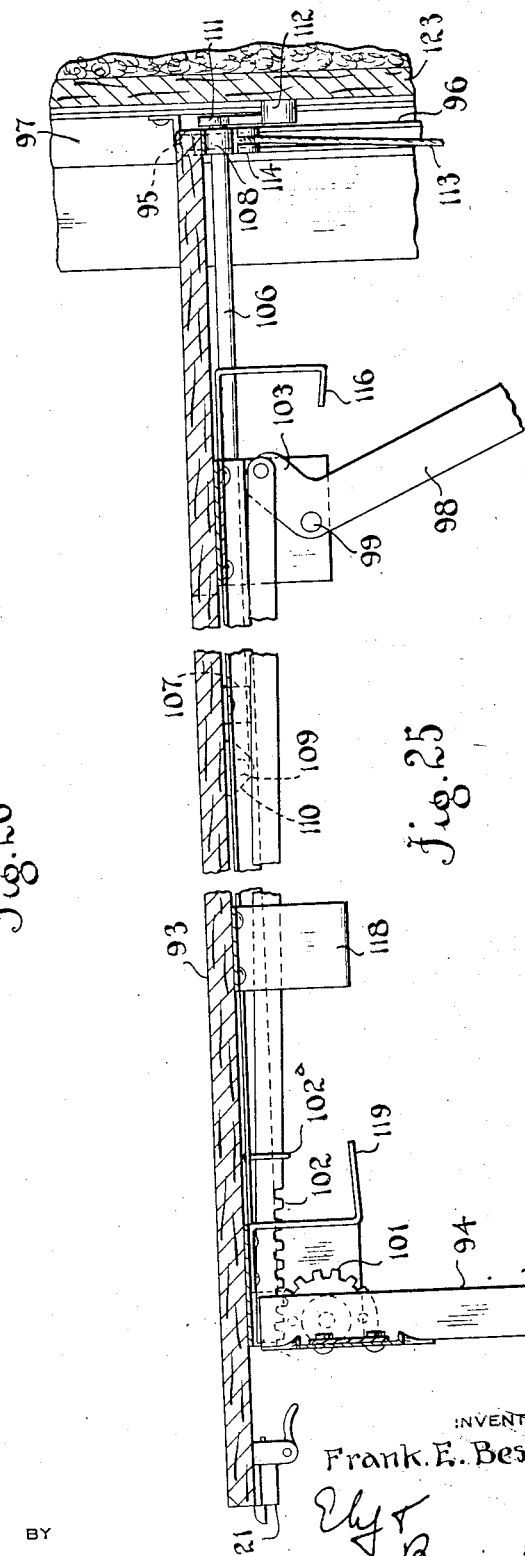
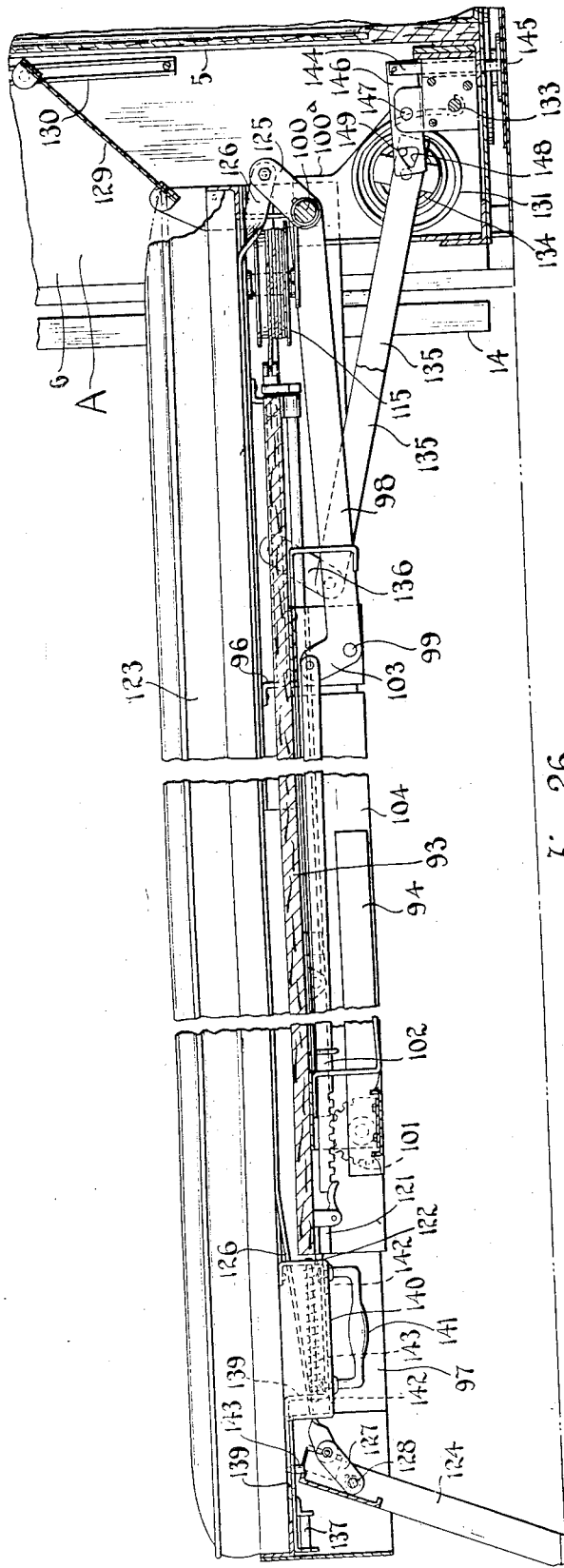
INVENTOR
Frank E. Bessler
BY
Ely & Barrow
ATTORNEYS March 27, 1934.  F. E. BESSLER  1,953,038
HOUSEHOLD APPLIANCE
Filed Dec. 24, 1931  16 Sheets-Sheet 12
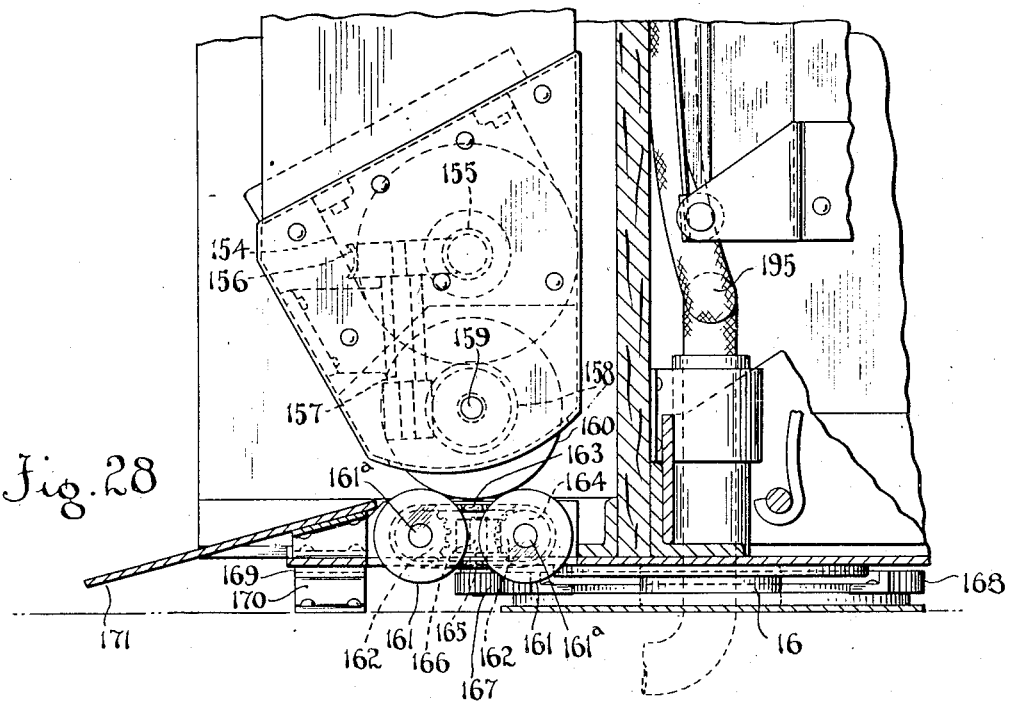
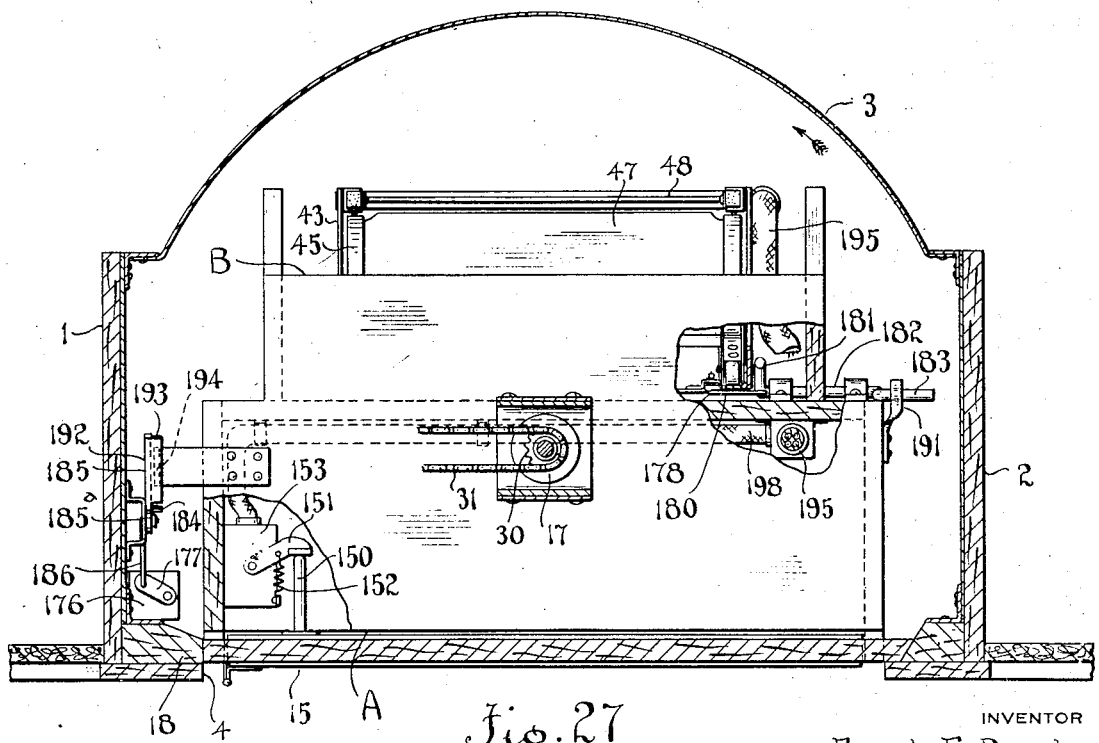
INVENTOR
Frank E. Bessler
BY
ATTORNEYS March 27, 1934.  F. E. BESSLER  1,953,038
HOUSEHOLD APPLIANCE
Filed Dec. 24, 1931  16 Sheets-Sheet 13
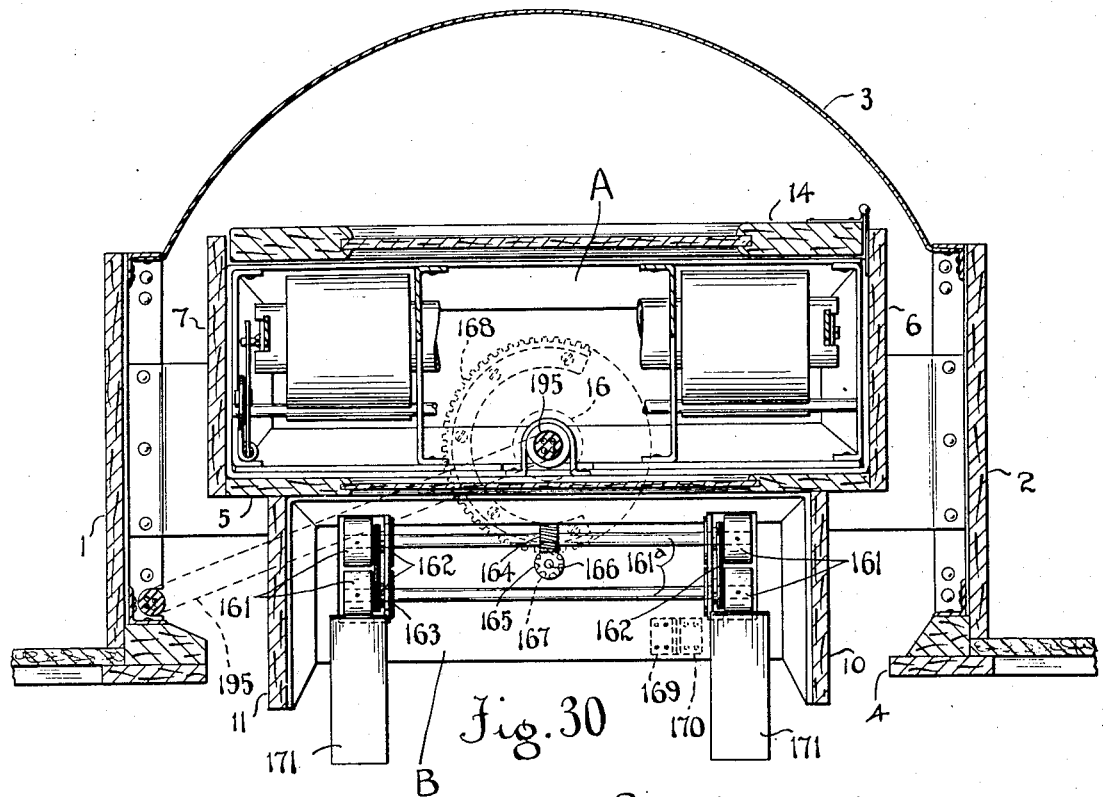
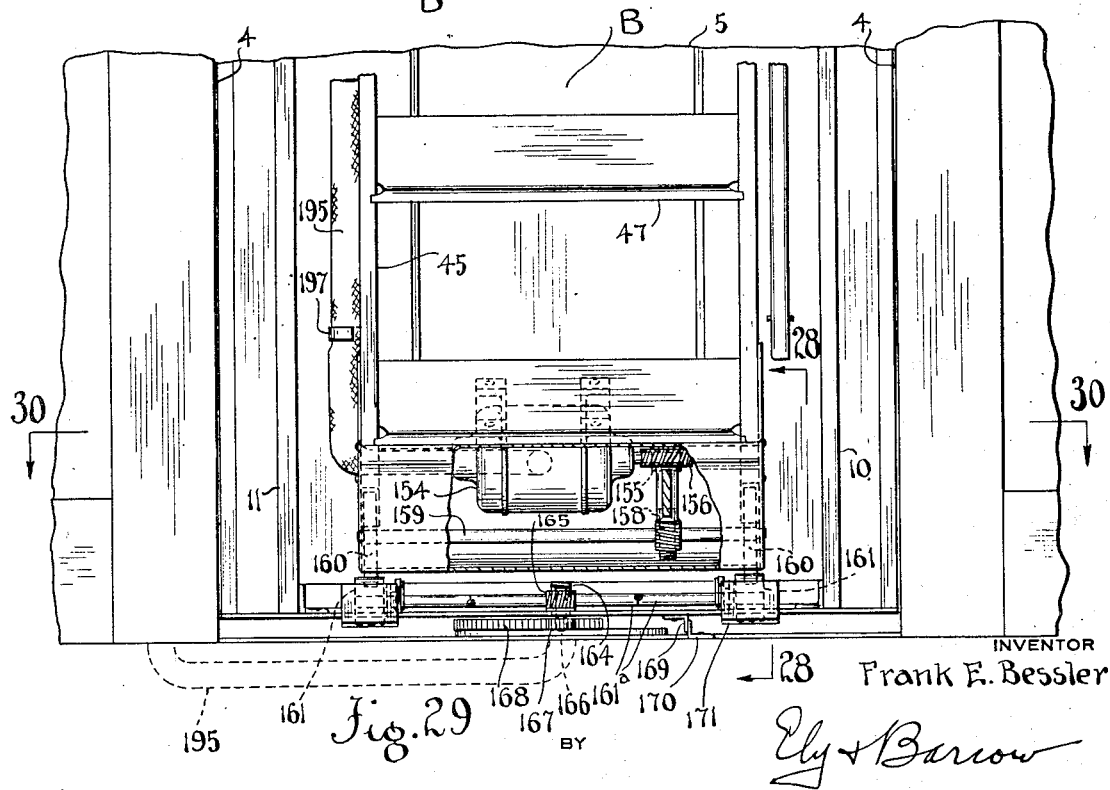
INVENTOR
Frank E. Bessler
BY Ely & Barrow
ATTORNEYS March 27, 1934.  F. E. BESSLER  1,953,038
HOUSEHOLD APPLIANCE
Filed Dec. 24, 1931  16 Sheets-Sheet 14
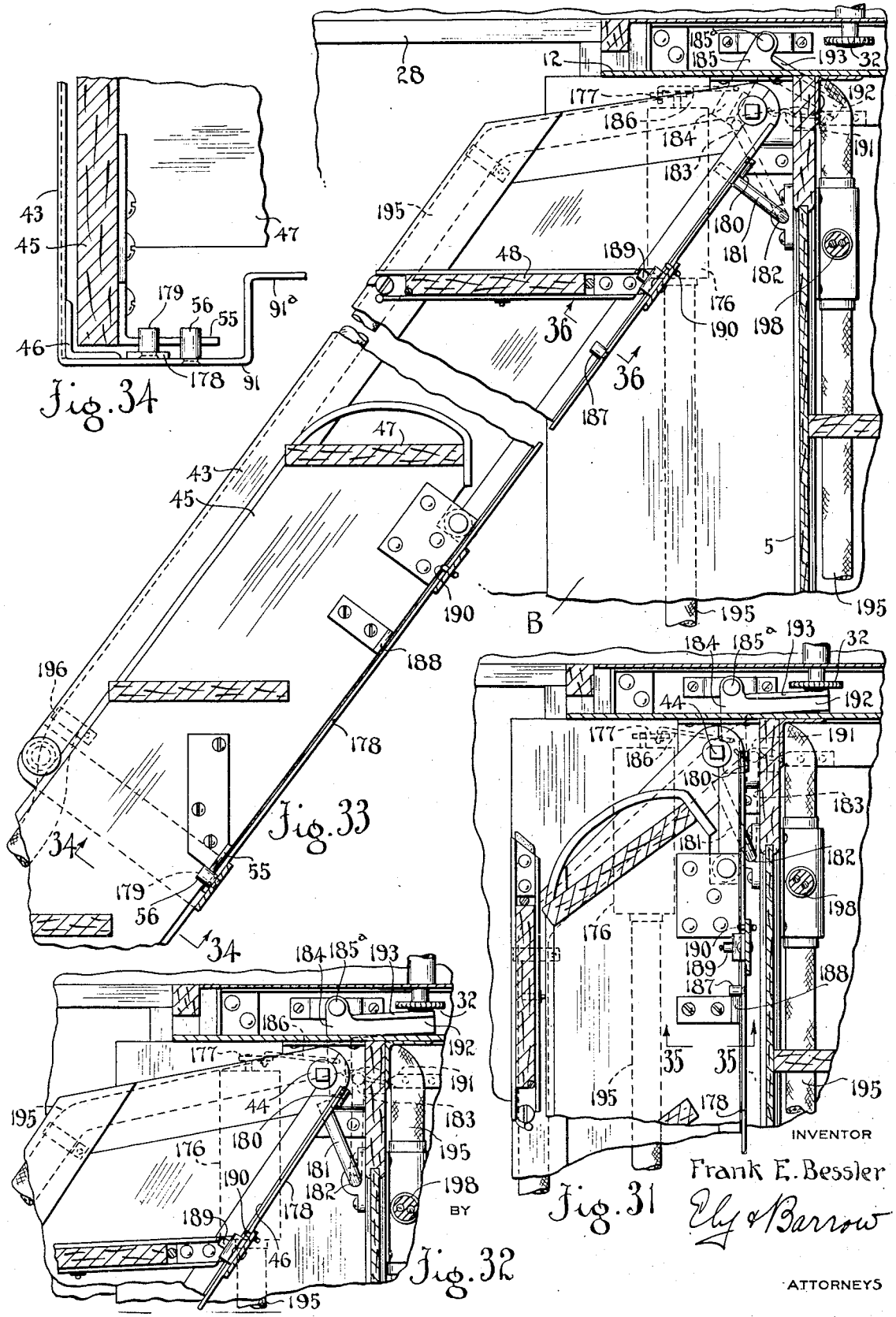
INVENTOR
Frank E. Bessler
BY Ely & Barrow
ATTORNEYS March 27, 1934.  F. E. BESSLER  1,953,038
HOUSEHOLD APPLIANCE
Filed Dec. 24, 1931   16 Sheets-Sheet 15

INVENTOR
Frank E. Bessler
BY
Ely & Barrow
ATTORNEYS

March 27, 1934.  F. E. BESSLER  1,953,038
HOUSEHOLD APPLIANCE
Filed Dec. 24, 1931  16 Sheets-Sheet 16

INVENTOR
Frank E. Bessler

ATTORNEYS

Patented Mar. 27, 1934

1,953,038

UNITED STATES PATENT OFFICE 1,953,038

HOUSEHOLD APPLIANCES

Frank E. Bessler, Akron, Ohio, assignor to The Bessler Disappearing Stairway Company, Akron, Ohio, a corporation of Ohio Application December 24, 1931, Serial No. 582,948

23 Claims. (Cl. 228—50)

This invention relates to household appliances.

The general purpose of the invention is to provide a compact structure for effectively providing a number of household appliances which may be selectively used and among which may be mentioned a disappearing stairway for giving access to an upper floor, a bed, a table with or without chairs, a closet, an ironing board, etc.

The various features mentioned above are associated in any of various combinations thereof with a cabinet which may be housed in the wall of a building and in which is a supporting structure arranged to be rotated between positions for giving access through the door of the cabinet to one or more of the contained devices or combinations thereof in each position to which said structure may be rotated.

Further objects of the invention are to arrange in such a cabinet an improved form of disappearing stairway; to arrange for the power operation of said stairway, and, if desired, also for power operation of the rotary structure; to provide an improved disappearing bed structure; and to provide an improved disappearing table structure.

The foregoing and other purposes of the invention are attained in the appliance shown in the accompanying drawings and described below. The invention is not limited to the specific forms thereof shown and described.

Of the accompanying drawings,

Figure 3 is a section on line 3—3 of Figure 1, the stairway being removed;

Figure 4 is an enlarged elevation of the cabinet door at the lock;

Figure 5 is a section on line 5—5 of Figure 4;

Figure 13 is an enlarged section on line 13—13 of Figure 10;

Figure 14 is an enlarged elevation of the lower hand rail support for the stairway and of the connected hand rail operating mechanism;

Figure 15 is a section on line 15—15 of Figure 14;

Figure 16 is a partial side elevation, partly in section, on line 16—16 of Figure 17, of the appliance showing the disappearing bed and disappearing table equipment positioned at the front of the cabinet;

Figure 17 is a front elevation thereof, partly in section, in line 17—17 of Figure 16;

Figure 25 is a section on line 25—25 of Figure 20;

Figure 26 is a fragmentary side elevation, partly in section, showing the bed extended to its position of use;

Figure 27 is a sectional plan through a modified form of the improved appliance showing arrangements for power operation of the rotary structure and stairway with the rotary structure shown in the position in which the stairway is concealed at the back of the cabinet;

Figure 28 is a fragmentary sectional side elevation on line 28—28 of Figure 29 of the lower end of the power operated stairway when in retracted position in the cabinet but positioned for movement out of the cabinet;

Figure 29 is a front elevation thereof, partly broken away;

Figure 30 is a sectional plan on line 30—30 of Figure 29, the stairway being removed.

Figure 31 is an enlarged side elevation, partly in section, of the upper end of the retracted power-operated stairway;

Figure 32 is a similar view illustrating the stairway in an intermediate position while being extended;

Figure 33 is a similar view showing the power-operated stairway fully extended;

Figure 34 is a section on line 34—34 of Figure 33;

Figure 1:
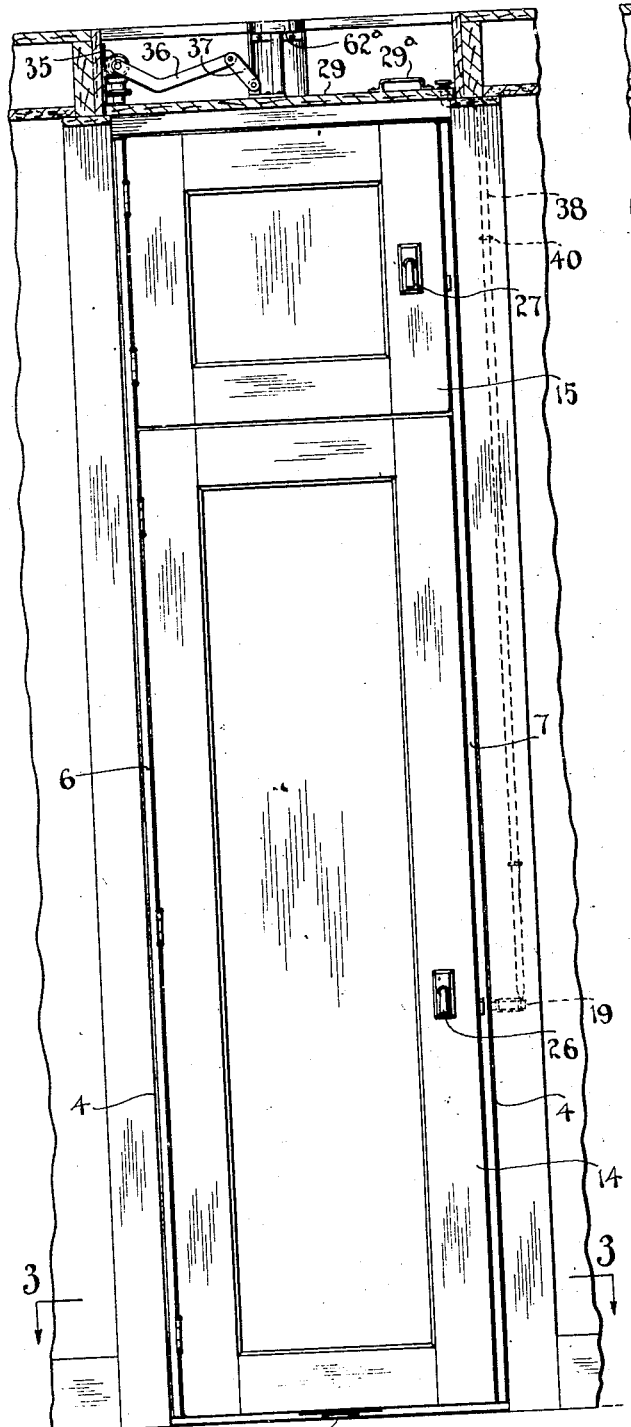
Figure 1 is a front elevation, partly in section, of a wall cabinet installation embodying the invention.
Figure 2:
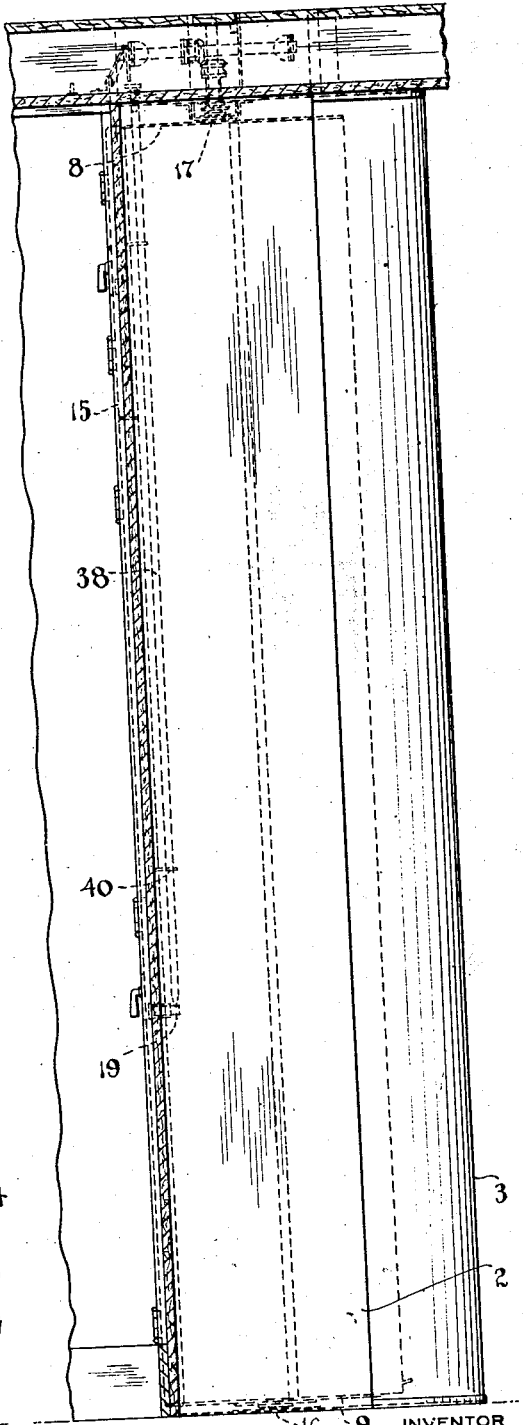
Figure 2 is a side elevation thereof, partly in section.

In the following description of the invention the several features of the invention will be referred to as the cabinet and rotary structure, the stairway, the bed and table structure, the power-operated stairway, and the portable cabinet.

The cabinet and rotary structure

The cabinet which may be arranged for installation in the wall of a building and extends from the floor to the ceiling of a room therein may be defined by side walls 1 and 2 and a rear wall 3, the cabinet opening at the front as at 4, the opening being suitably framed as by the standard trim or woodwork of the rest of the room.

Within the cabinet there is provided a rotary structure arranged to revolve upon its vertical axis and including a central wall 5 with which may be associated on one side, side walls 6 and 7, a top wall 8 and a bottom wall 9 for providing a space or closet A in which may be housed a folding table, folding bed, folding chairs, etc., and also with which central wall 5 may be associated side walls 10 and 11 and top and bottom walls 12 and 13 defining a closet or a space B in which may be housed a disappearing stairway, ironing board, etc. The closet or space A may be provided either with a single closure or door or lower and upper doors 14 and 15 hinged to one side wall thereof such as wall 6. This structure is arranged to be rotated about a vertical axis by means of a lower bearing 16 on the floor of the wall cabinet space and an upper bearing 17 secured to the ceiling of the wall cabinet space. As shown in Figure 3 the rotary structure may be rotated from the position shown in the direction of the arrow to a position in which closet or space B is presented to the opening 4 of the cabinet and then reversely back to the position shown, the jamb 18 limiting rotation of said structure clockwise from the position shown.

The rotary structure preferably is arranged so that closet A is normally at the opening 4 and may be automatically locked in said position by a pivoted latch 19 (Figures 4 and 5) normally urged by a spring 20 into engagement with a keeper plate 21 on the rotary structure, this latch preferably being constructed to be released by a slidable block 22 provided in wall 7 in the keeper 23 for a latch 24 on door 14. Latch 24 is operable by a lever 24a from the position shown in Figure 5 in either direction against the action of springs 25, 25 acting on opposite sides of said lever. Lever 24a is connected to an operating handle 26. By operating latch 24 to the right (Figure 5) latch 19 may be disengaged to permit rotation of the rotary structure. By operating latch 24 to the left (Figure 5) the door 14 may be opened, the rotary structure being maintained locked. Door 15 may have a standard latch operable by handle 27.

The disappearing stairway

Figure 6:
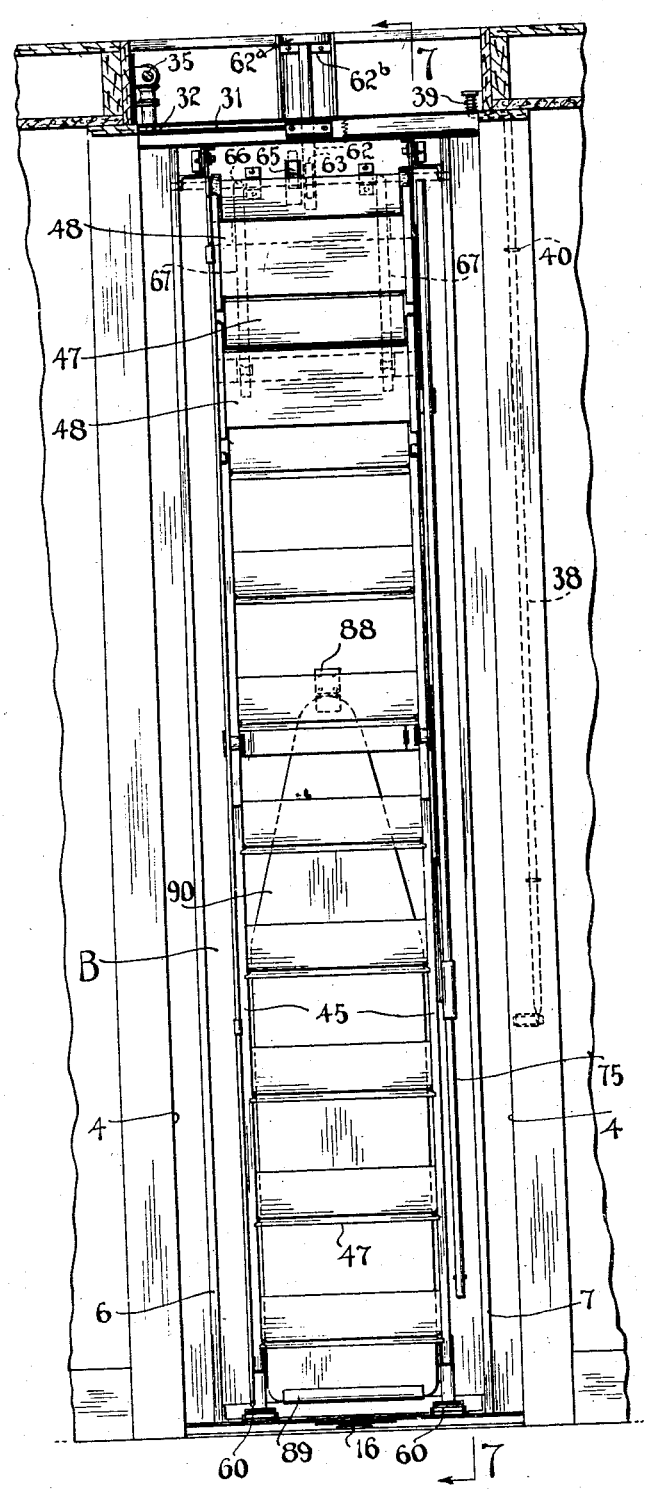
Figure 6 is a front elevation of the device with the stairway in a position ready to be extended for use.

A disappearing stairway is shown housed in closet or compartment B. When this is used, a ceiling opening defined by a suitable frame structure 28 is provided extending from the interior of the wall cabinet outwardly and preferably provided with a closure panel 29, hinged at one side edge of said ceiling opening. This panel may be adapted to be opened manually only, but preferably mechanism is provided for opening the panel as the rotary structure is rotated to present compartment B to the opening 4 of the cabinet. This mechanism may comprise a sprocket 30 (Figure 8) adapted to rotate with the rotary structure, a chain 31 (Figure 6) trained about said sprocket, a sprocket 32 driven by said chain, a gear 33 driven by said sprocket, a gear 34 meshed with gear 33 and secured on a shaft 35, an arm 36 on shaft 35 and a link 37 connecting arm 36 to panel 29. By this construction the panel may be opened by rotation of the rotary structure or the latter may be rotated by opening of the panel from the upper floor, a handle 29a being provided on the panel for this purpose. A depressible rod 38, normally held up as by spring 39, extends down into the cabinet through guides 40, 40 to the latch 19 (see Figures 4 and 5), the lower end of rod 38 having a wedge formation 38a for wedging between the end 19a of latch 19 and an angle member 41 having a notch 42 therein through which the end 19a of the latch extends. By depression of rod 38 the latch 19 is released to permit rotation of the rotary structure by opening of the panel.

Figures 8, 9:
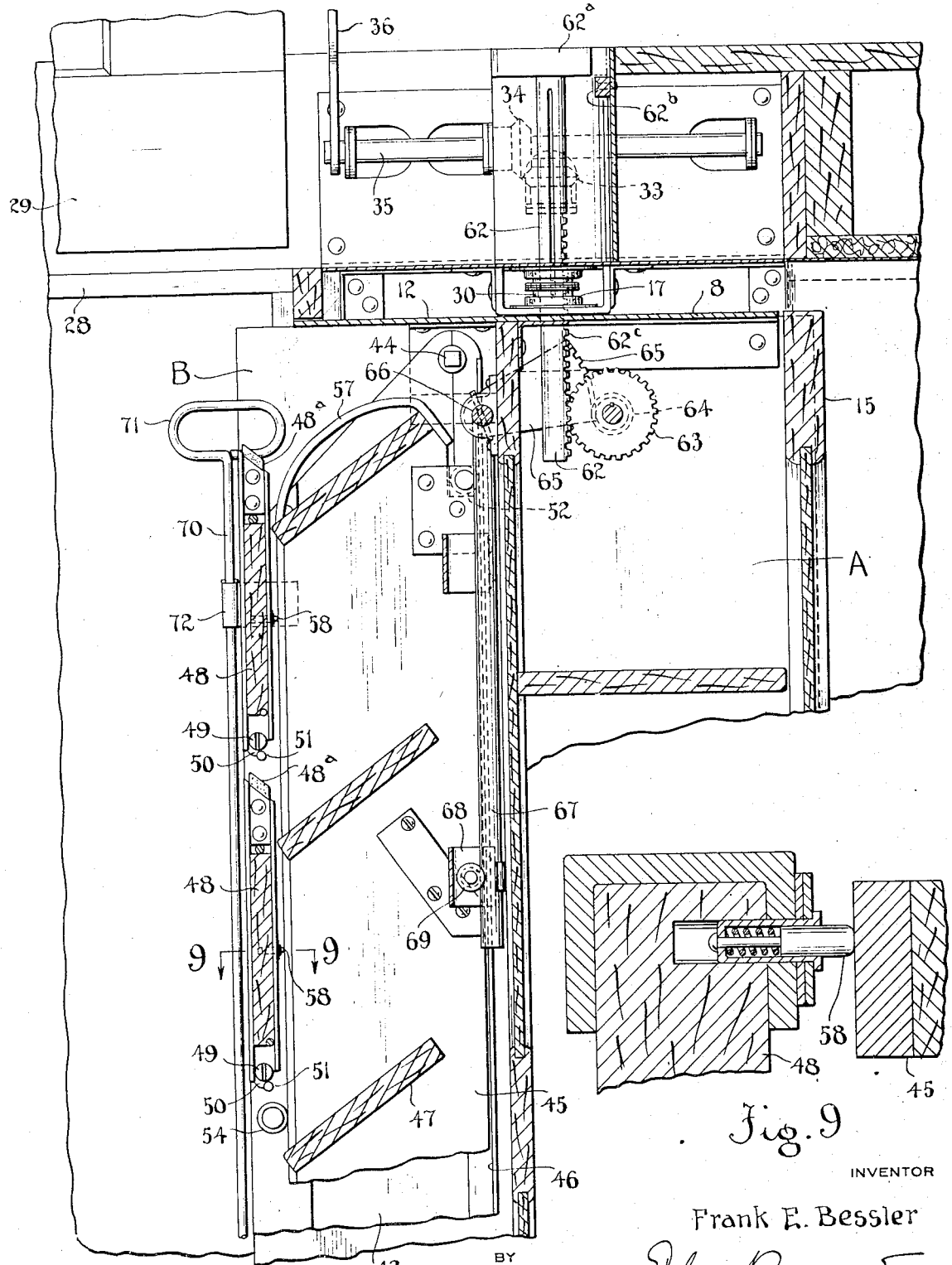
Figure 8 is an enlarged vertical sectional view of the upper portion of the stairway as shown in Figure 7.
Figure 9 is a section along line 9—9 of Figure 8.

The stairway structure is telescopic, it comprising upper stringer sections 43, 43 hinged at 44, 44 at the top inside corners of compartment B and lower stringer sections 45, 45 movable on rails 46, 46 on the inside of the upper sections, the usual treads 47, 47 being secured between stringers 45 and stringers 43 having treads 48, 48 pivoted thereon as at 49, 49 and adapted to be swung upwardly and outwardly to the positions shown in Figure 8, outward movement being limited by lugs 50, 50 engaging pins 51, 51. The top ends of the stringers 45 are provided with rollers 52, 52 for rolling along rails 46 and rollers are provided as at 53 and 54 on stringers 43 to retain the lower stairway section in telescopic engagement with the upper section. Stops 55 and 56 respectively on the lower and upper stairway sections limit extension of the lower stairway section. Recesses 52a, 52a are provided in rails 46 to receive rollers 52 when the stairway is fully extended to resist accidental retraction or telescoping of the stairway when in use.

The top ends 57, 57 of stringers 45 are adapted to engage treads 48 as the stairway is retracted to swing the treads 48 out of the way to permit full retraction of the stairway (see Figure 8), yielding pins 58, 58 (Figure 9) on the under sides of treads 48 being engaged by the ends 57 of the stringers to reduce friction and noise. The inner corners of the treads 48 are provided with yielding pads 48a adapted to seat on the rails 46 when the stairway is extended, these supporting the treads 48 in operative position.

The lower ends of stringers 45 are provided with rollers 59 whereby the lower end of the stairway will roll over the floor of the room when being extended and retracted. Tilting tracks 60, 60 are pivoted at 61 in the bottom of the compartment B to support the lower end of the stairway. The rollers 59 rest on the tilting tracks 60 to the rear of the pivots 61 when the stairway is retracted and the tracks are so arranged to incline inwardly when the stairway is retracted to prevent accidental outwardly movement of the stairway. As the stairway is moved outwardly, these swing downwardly outwardly of the pivots 61 providing inclines for the rollers 59. The outer ends of the tracks normally remain down when there is no pressure on the inner ends, preferably by being overbalanced whereby the outer ends of the tracks facilitate movement of the stairway back into its compartment after use.

To provide for extension of the stairway from the upper floor, an operating rod 62 is extended down from above through the axis of the bearing structure 17 in which it is keyed to rotate with the rotary structure, the upper end of the rod having a head 62a thereon adapted to be depressed only when the compartment B is presented to the cabinet opening 4. To prevent depression of this head at other times a stop 62b is provided and the head is of such shape that it will only clear this stop when the rotary structure is in the correct position. The rod 62 is formed with a rack 62c engaging a pinion 63 in the top of compartment A which has connected therewith a gear 64 meshed with a sector 65 pivoted at 66 in the rear of compartment B and having a rod 67 connected thereto and extending through a guide 68 in cooperation with a roller 69 therein on the upper section of the stairway, arm 67 being adapted to swing outwardly as rod 62 is depressed from above to swing the stair structure outwardly about its pivots 44, the lower section of the stairway extending under the action of gravity.

Provision for the retraction of the stairway from the upper floor is made by slidably attaching a rod 70 having a handle 71 to the upper and lower stairway sections as by mounting it in brackets 72 and 73 and providing a lug 74 thereon for engaging a part on the lower stairway section such as the bracket 73 to telescope the sections of the stairway. An upward pull on rod 70 causes the stair structure to telescope and also to swing inwardly into compartment B.

Figure 7:
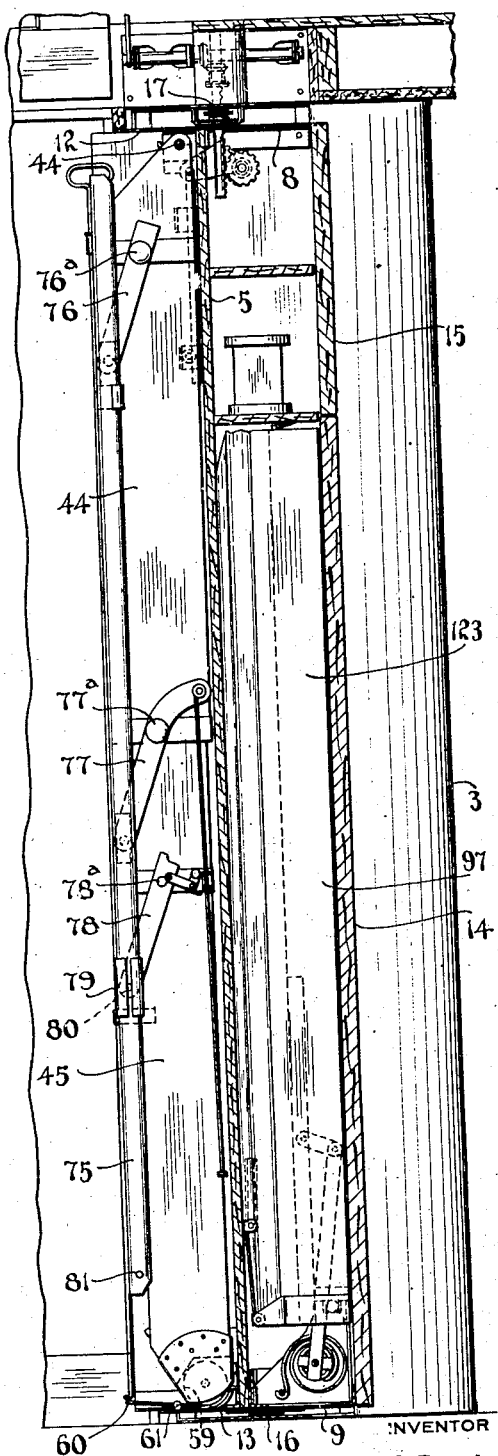
Figure 7 is a section along line 7—7 of Figure 6.
Figure 10:
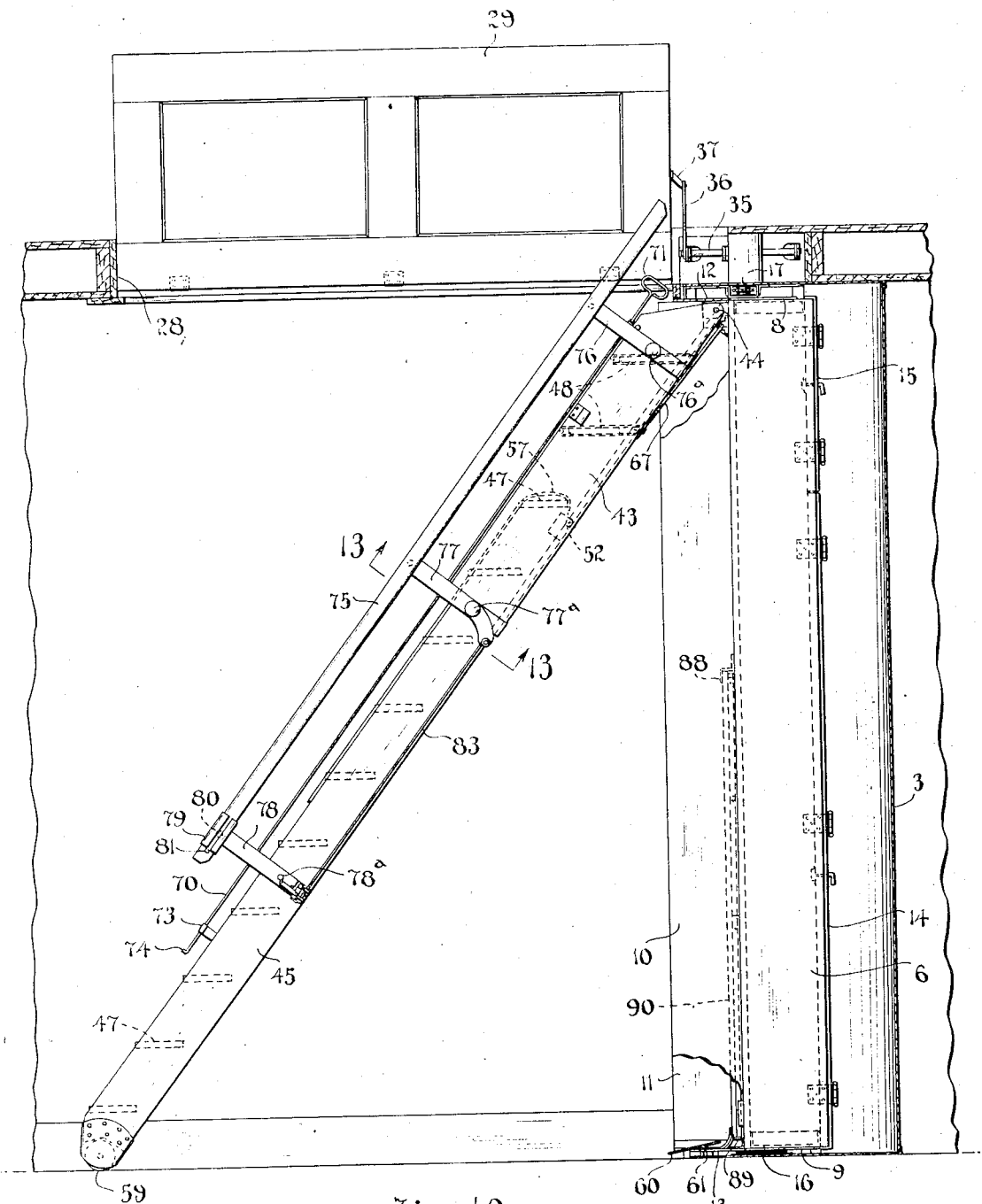
Figure 10 is a side elevation showing the stairway extended for use.

The stairway may be provided with a hand rail 75 pivotally mounted on collapsible posts 76, 77 and 78, the first two of which are mounted on the upper stairway section 43 and the third on the lower stairway section 45 (see Figure 10). Post 76 is pivoted as at 76a; post 77 is pivoted as at 77a; and post 78 is pivoted as at 78a whereby the hand rail may move between a collapsed position at the side of the stair structure (Figure 7) to an extended position for use (Figure 10). To this end the hand rail 75 is arranged to slide through a guide 79 pivoted on top of post 78 as at 78a as at 80. A pin 81 on the hand rail is arranged to engage guide 79 as the stairway is extended to swing post 78 and consequently posts 77 and 76 upwardly from their positions in Figure 7 to their positions in Figure 10, this movement being limited by a stop pin 82 (see Figures 13 to 15) with which the lower end of post 78 is adapted to engage. In order to hold the hand rail rigidly in its raised position, a rod 83 extends from the lower end of post 77 through a guide 84 and has a head 83a on its lower end arranged to be drawn into engagement with said guide (see Figure 14) when the stairway is extended. A latch 85 pivoted at 86 is connected by a link 87 to the lower end of post 78 whereby as the post 78 swings into its raised position latch 85 is caused to engage below head 83a and hold it against downward movement.

Figures 11, 12:
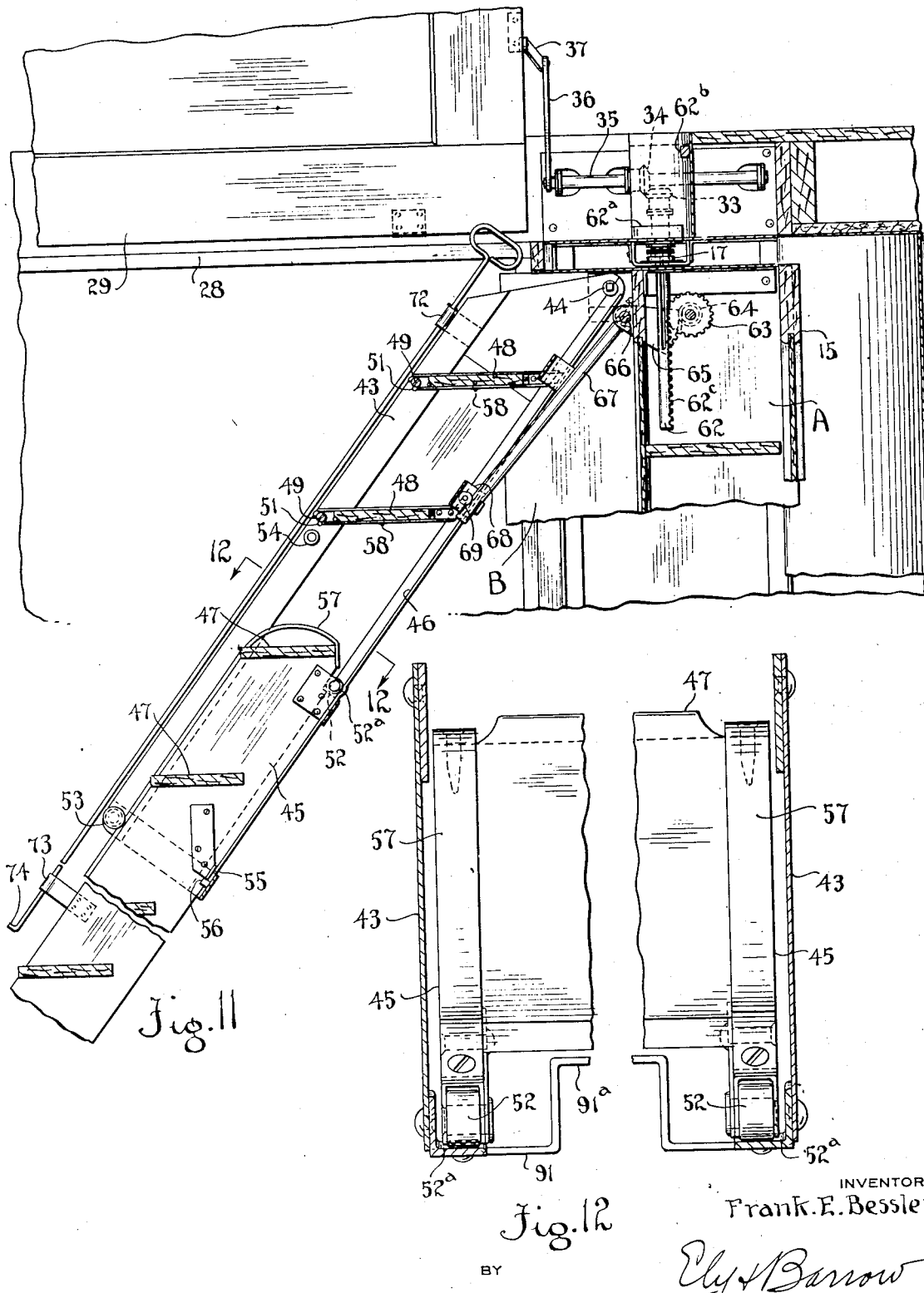
Figure 11 is an enlarged vertical sectional view of the upper right hand portion of Figure 10.
Figure 12 is a section on line 12—12 of Figure 11.
Figure 20:
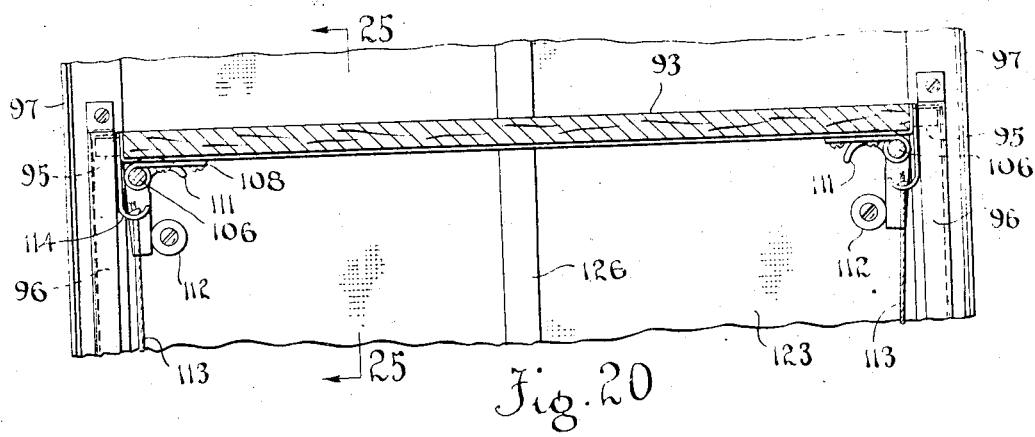
Figure 20 is a section on line 20—20 of Figure 18.
Figure 19:
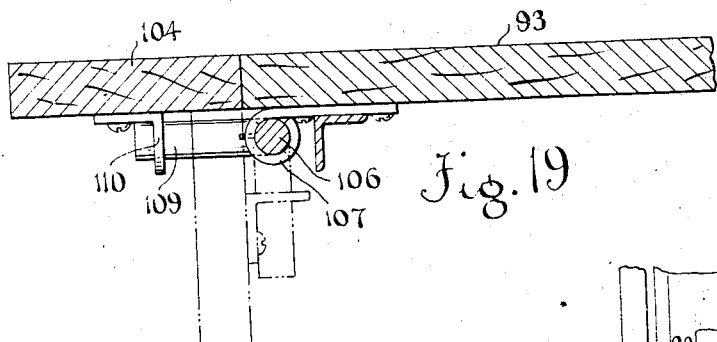
Figure 19 is a section on line 19—19 of Figure 18.
Figure 18:
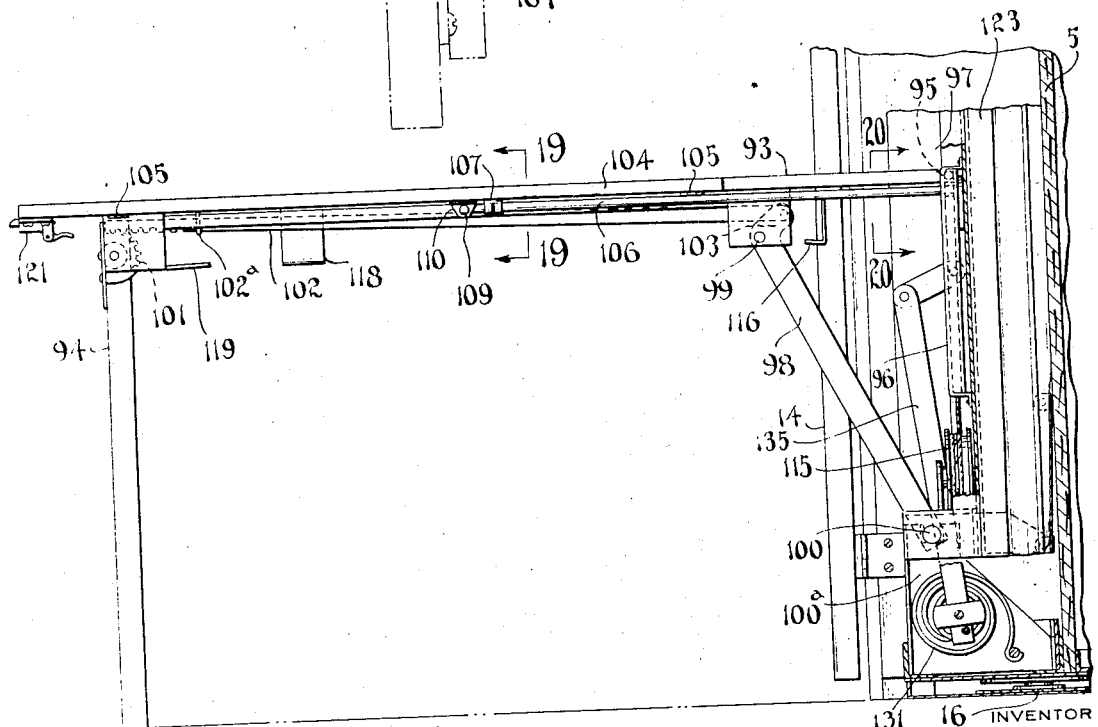
Figure 18 is a side elevation of the table extended to a position of use.
Figure 21:
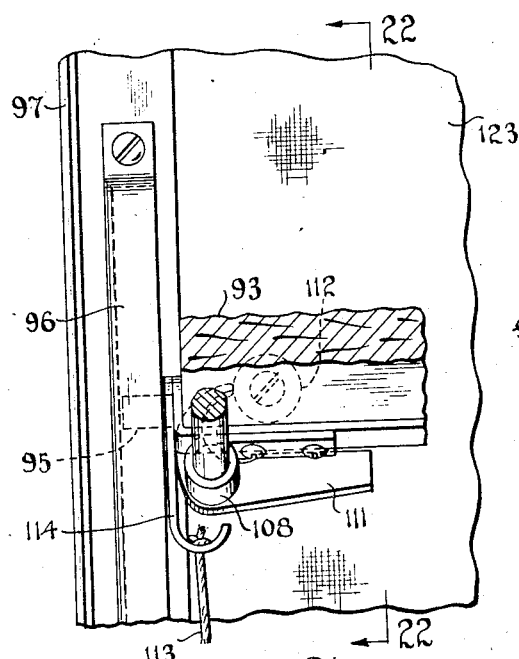
Figure 21 is a detail front elevation, partly in section, at one side of the inner end of the table illustrating the table leaf operating mechanism in collapsed position just before the table while being moved to extended position has actuated said mechanism.
Figure 22:
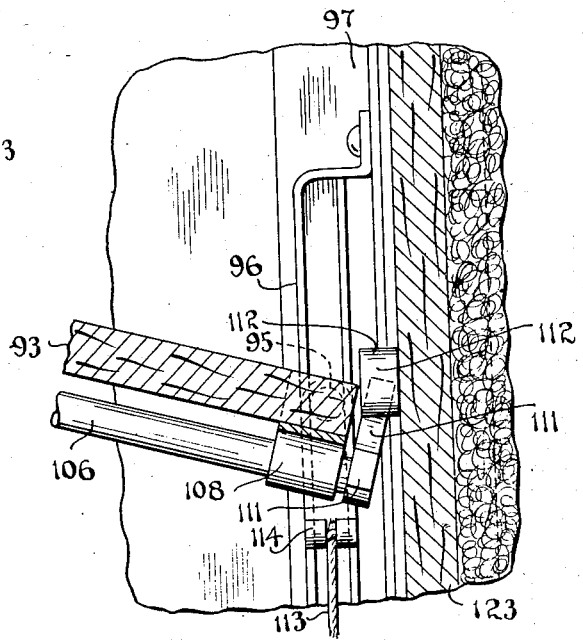
Figure 22 is a section on line 22—22 of Figure 21.
Figure 24:
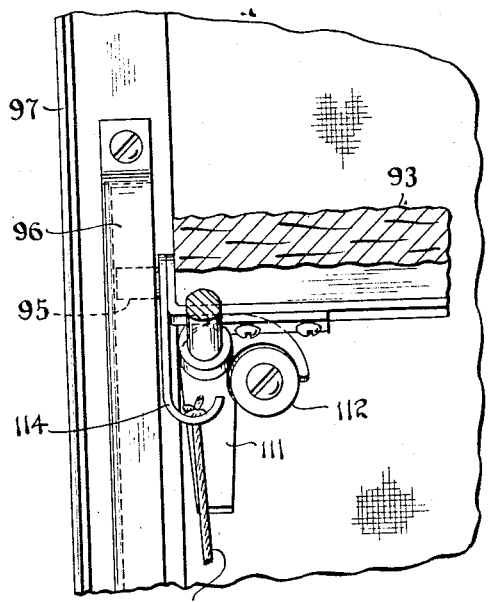
Figure 24 is a similar view showing the table-leaf mechanism actuated to extend the leaf.
Figure 23:
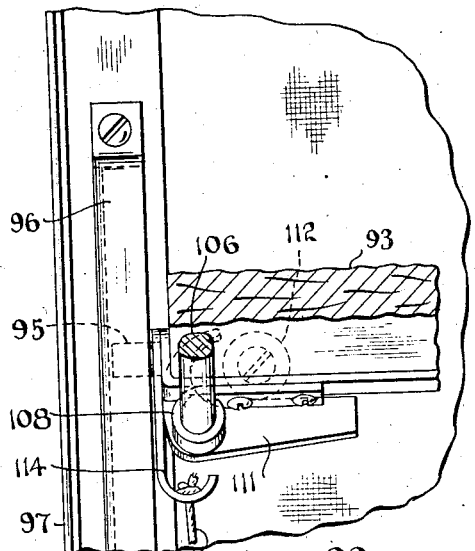
Figure 23 is a view similar to Figure 21 showing the table leaf operating mechanism with the parts substantially in cooperation to start the operation of the table leaf mechanism to extend the table leaf.

Compartment B may be provided with suitable clips at 88 and 89 removably to support a suitable foldable ironing board 90 therein and in order to clear this the various transverse braces such as 91 (Figures 12 and 13) usually used on stair structures of this type between the stringers may be off-set as at 91a.

The folding table

The upper portion of compartment A closed by door 13 may be provided with a shelf 92 defining a closet space above the same. The lower part of compartment A may house a folding table (along with folding chairs if desired) and a folding bed, either one or the other or both.

The folding table comprises a central table member 93 on which is pivoted adjacent the upper or outer end thereof a leg structure 94, the inner or lower end of the table member 93 (see Figures 16 to 25) having pins or rollers 95, 95 extending sideways therefrom into guides 96, 96 either fixed at the sides of panel 5 of compartment A when a folding bed structure is not employed, or fixed in the appliance shown adjacent the inside faces of the members 97, 97 on the bottom of a folding bed structure to be described.

Links 98, 98 are pivoted to the under side of the central member 93 of the table as at 99, 99 and are pivoted on a fixed cross shaft 100 supported on suitable brackets 100a, 100a in the lower part of compartment A. By means of these links it will appear that as the table is swung outwardly at its upper end from the position shown in Figure 16 to the position shown in Figure 18 the inner end of the table will be caused by links 98 to travel upwardly in guides 96 to the top thereof.

Provision is made for extending and retracting the leg structure 94 between a folded position and a table-supporting position as the table 93 is swung out of or back into the cabinet. Suitable means for this purpose comprises sector gears 101, 101 attached to the sides of the leg structure and racks 102, 102 slidable and slightly shiftable in a vertical plane in suitable guides 102a on the under side of the table, and pivotally connected to extensions 103, 103 on links 98 whereby movement of the links as has been described between the folded and unfolded positions of the table is utilized to extend and fold the leg structure 94.

The table is preferably provided with either one or two leaves 104, 104 hinged as at 105, 105 on that portion of the table which extends beyond the cabinet. These leaves may be arranged to be drawn up and locked in position when the table is extended to provide a table considerably wider than the cabinet and to be folded to such positions with respect to the table as not to interfere with its movement between folded and unfolded positions. Preferably means are provided for extending and folding the leaves automatically.

The automatic leaf-actuating mechanism includes rods 106, 106 extending longitudinally of the table and rotatably mounted in brackets 107, 107 and 108, 108 on the under side of the table, these rods at their outer ends having outwardly extending arms 109, 109 (Figure 19) slidably engaged in apertures through lugs 110, 110 fixed to the under sides of the leaves. At their inner ends, rods 106 have J-shaped dogs 111, 111 secured thereon (see Figures 21 to 24) which are arranged to engage fixed projections 112, 112 secured either to the under side of the bed where the bed is provided, or in any suitable fashion when the bed is not provided, adjacent the upper ends of guides 96 inwardly of the sides of the guides. The J-shaped dogs 111 are so arranged respecting the projections that the straight shanks of the dogs which extend inwardly when the leaves are folded (Figures 20 and 21) are adapted to engage the projection 112 as the inner end of the table moves upwardly (see Figure 23) and to be swung downwardly as the table moves into its extended position (see Figure 24), in which position the curved portion of the J overhangs the projections 112. The leaves are thus extended. As the inner end of the table is moved downwardly to fold the same into the cabinet, the curved portions of the J engage the projections 112 and swing the dogs 111 from the positions shown in Figure 24 to the positions shown in Figure 21, thus folding the leaves.

To facilitate handling of the table, its weight may be counterbalanced in any suitable way as by connecting cables 113, 113 to brackets 114, 114 attached to the inner end of the table (see Figures 21 to 24) and winding said cables on suitable spring rewinding drums 115, 115 secured beneath guides 96 either to the under side of the bed or in any other suitable way when a bed is not provided with the appliance.

The table may be provided on its under side with suitable clips 116, 117, 117, 118, 118, and 119 for removably retaining one or more folding chairs 120 (see Figure 17) of known construction.

To retain the table in folded position, a suitable latch may be provided as at 121 for engagement with a keeper 122 either on the under side of the bed when such is provided or suitably fixed in the compartment A when the bed is omitted.

The folding bed

This comprises a suitable bed structure 123 pivoted at its inner end in compartment A on the fixed shaft 100 whereby it may be swung between a vertical position in compartment A (Figures 16 and 17) and a horizontal extended position for use (Figure 26). The upper or outer end of the bed is provided with a supporting foldable leg structure 124 which is preferably arranged to be automatically extended as the bed is swung to its position of use. Arm 125 is fixed on shaft 100 and is connected by a link 126 relatively shiftable on the under side of the bed structure with a toggle arm 127 secured as at 128 to the leg structure whereby swinging of the bed, arm 125 and consequently the pivot 128 for link 126 remaining fixed, causes a relative shifting movement of the link respecting the bed actuating toggle arm 127 between the relative positions thereof shown in Figures 16 and 26 to extend and fold the leg structure 124.

A head rest 129 may be pivotally secured to the upper inner corner of the bead and pivotally and slidably mounted in vertical guides 130, 130 on the sides of compartment A to be moved between a collapsed position (Figure 16) and a position of use (Figure 26) as the bed is extended.

To facilitate handling of the bed it is preferably counterbalanced as by coil springs 131, 131 in the bottom of compartment A, one end of each spring being secured as at 133 (Figures 16 and 26) and the other end being connected with a shaft 134 to which is secured arms 135, 135 connected by links 136, 136 to the bed structure, extension of the bed acting to wind the springs through arms 135 to provide gradually increased spring resistance off-setting the weight of the bed as it is being swung.

A latch is provided at 137 for engaging with a keeper 138 on the under side of shelf 92 to hold the bed in its folded position. This latch is secured to a shiftable plate 139 extending into a housing 140 on the under side of the bed, a handle 141 being connected through slots 142, 142 in housing 140 (see Figure 26) to the plate 139, a spring 143 normally urging said latch and handle upwardly or outwardly into latching engagement with keeper 138. By pulling down on the handle to pull the bed down from its folded position, latch 139 is released. A pin 143 is arranged on plate 139 to be engaged by the upper end of the leg structure to retract the latch when the bed is extended so that it will not project beyond the end of the bed.

In order to lock the rotary structure against rotation when the bed is extended to prevent sidewise movement of the bed, a locking pin 144 (Figure 26) is vertically shiftable through the bottom of the rotary structure into a socket at 145 in the floor of the cabinet. This locking pin has an operating lever 146 pivotally connected thereto, the lever being pivoted as at 147 and having a triangular aperture at 148 therein through which extends an operating pin 149 arranged on an extension on one arm 135 whereby when the bed is extended lever 146 will be actuated to depress pin 144, the pivotal connection between lever 146 and pin 144 being sufficiently loose to compensate for the arcuate travel of the lever with respect to the straight travel of the pin.

The power operated stairway

The equipment may be provided with power means for rotating the rotary structure between its normal position wtih compartment A to the front and a position with compartment B at the front and for extending and retracting the stairway in compartment B. When such means are provided, then the closure door or doors 14 and 15 are provided with means such as inwardly projecting pins 150 (Figure 27) for depressing a switch arm 151 normally urged to an open position by spring 152 to maintain a switch, housed at 153, open, the switch 153 being in the power circuit as will be described to prevent power operation of the rotary structure and stairway unless said door or doors are closed.

For operating the rotary structure and stairway by power, a motor 154 (Figures 28 to 30) may be mounted on the lower end of the stairway, the shaft thereof having a worm 155 thereon meshing with a worm gear 156 on a shaft 157. Shaft 157 has a worm thereon meshing with a worm gear 158 on a shaft 159 on which are secured driving and propelling rollers 160, 160. These rollers rest in compartment B on pairs of rollers 161, 161 on shafts 161a, 161a having sprockets 162, 162 thereon about which are trained chains 163, 163. One of shafts 161a has a spiral gear 165 on a shaft 166 extending down through the bottom of the rotary structure and having a pinion 167 thereon meshed with a fixed sector rack 168 on the floor of the cabinet concentric with the axis of the rotary structure. By this construction it will appear that when the motor is first driven (compartment B being at the back of the cabinet) the rollers 160 will drive rollers 161 to rotate the rotary structure until compartment B is at the front of the cabinet. Stops 169 and 170 respectively on the rotary structure and floor of the cabinet are arranged to engage when the rotary structure has been turned to the position shown in Figure 30. This locks the rollers 161 against further rotation. Continued rotation of wheels 160 causes these to propel the lower end of the stairway forwardly off rollers 161 and down fixed tracks 171 out over the floor until the stairway is fully extended. It will be apparent that if motor 154 is reversely driven the stairway being extended, the lower end of the stairway will be propelled inwardly up over tracks 171 into the cabinet onto rolls 162, whereupon these will be driven to turn the rotary structure back to its original position (Figure 27).

In order to start the motor, manually operable three-way switches 172 and 173 may be arranged on each floor and to stop the motor and set it for reverse, a pair of reversing switches 174 and 175 are arranged to be simultaneously and automatically operated as the stairway moves into its extended position and as the rotary structure is returned to its original position.

The switches 174 and 175 may be mounted in a housing 176 (see Figures 27, 31 to 33) at one side adjacent the top of the cabinet so as to be adjacent the upper end of the stairway and adjacent the side of the rotary structure. These switches are simultaneously operable by a single arm 177. The switch mechanism illustrated and described in co-pending application Serial No. 487,759, filed October 10, 1930, may be used for this purpose.

Figure 35:
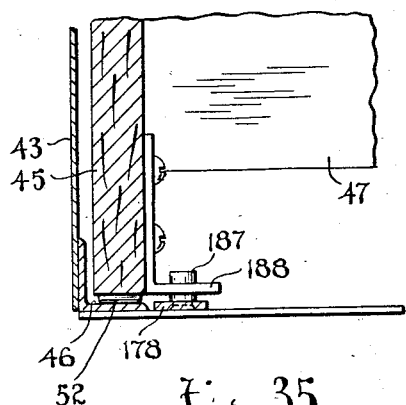
Figure 35 is a section on line 35—35 of Figure 31.
Figure 36:
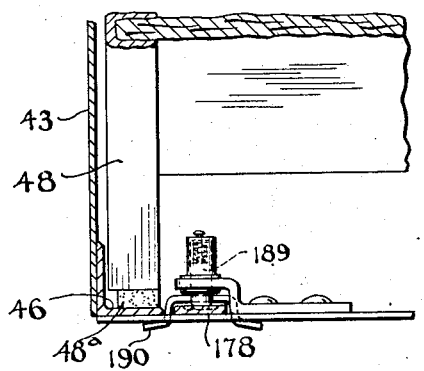
Figure 36 is a section on line 36—36 on Figure 33.

For operating the switch arm 177 as the stairway moves into its extended position, a slide 178 is shiftably mounted on the upper section of the stairway and has a pin 179 thereon adapted to be engaged by the stop 55 and drawn downwardly. The upper end of slide 178 has a lug 180 thereon engaging an arm 181 on a shaft 182 on which is an arm 183, the end of which rides in engagement with one arm 184 of a bell crank lever 185 pivoted at 185ª. A link 186 connects the bell crank lever to the switch arm 177. To return slide 178 to its original position as the stairway is retracted a pin 187 thereon is arranged to be engaged by a lug 188 on the lower section of the stairway (Figure 35). Figure 31 shows the parts with the stairway retracted; Figure 32 illustrates the parts just before the stairway is fully extended and Figure 33 illustrates the parts actuated to stop the motor in the fully extended position of the stairway. A spring pressed detent 189 (Figure 36) engages slide 178 yieldingly to resist movement thereof in either direction. Guides 190, 190 hold the slide against sidewise movement. A yielding clip 191 is provided to yieldingly hold arms 183 and 181 upwardly in their original positions (see Figure 31).

The stopping of the motor and resetting of the switches 174 and 175 when the rotary structure is returned to its original position with compartment B at the back of the cabinet may be effected through the bell crank lever 185. The arm 192 of this lever may engage a suitable cam lug 194 (Figure 27) affixed to the rotary structure to engage under said flange 193 to swing lever 185 back from the position shown in Figure 33 to the position shown in Figure 31.

The leads cable 195 may be carried to the motor up through the lower bearing of the rotary structure (Figure 28) to the top of the cabinet, then down along the stair structure (Figure 33) to the motor (Figure 29), it being secured as at 196 and 197 on the upper and lower sections with a portion between which may festoon when the stairway is retracted. The leads cable 195 may be carried up to the switch up through the bottom of the cabinet along the side wall thereof.

Figure 37:
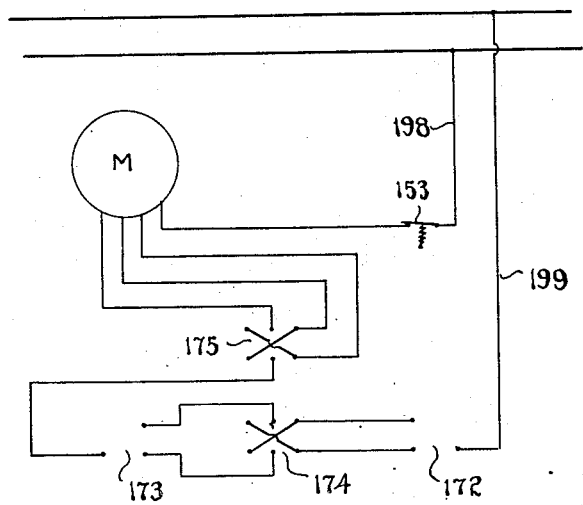
Figure 37 is a wiring diagram for the power operated device.

The wiring diagram is shown in Figure 37, the power leads being indicated at 198, 199, a manually operable switch 172 for one floor lever being connected to lead 199 and adapted to connect said lead to one side or the other of reversing switch 174 which stops the motor M which in turn is adapted to connect lead 199 to one side or the other of manually operable switch 173 on the other floor level and through this switch to reversing switch 175 which controls the direction of motor M. Lead 198 is connected through one or more of the door-controlled switches 153.

In the motor-operated form of the invention, the latch 19 may be omitted or so interconnected with the power operation as to be released when the power is applied to operate the stairway.

The portable cabinet

Figure 38:
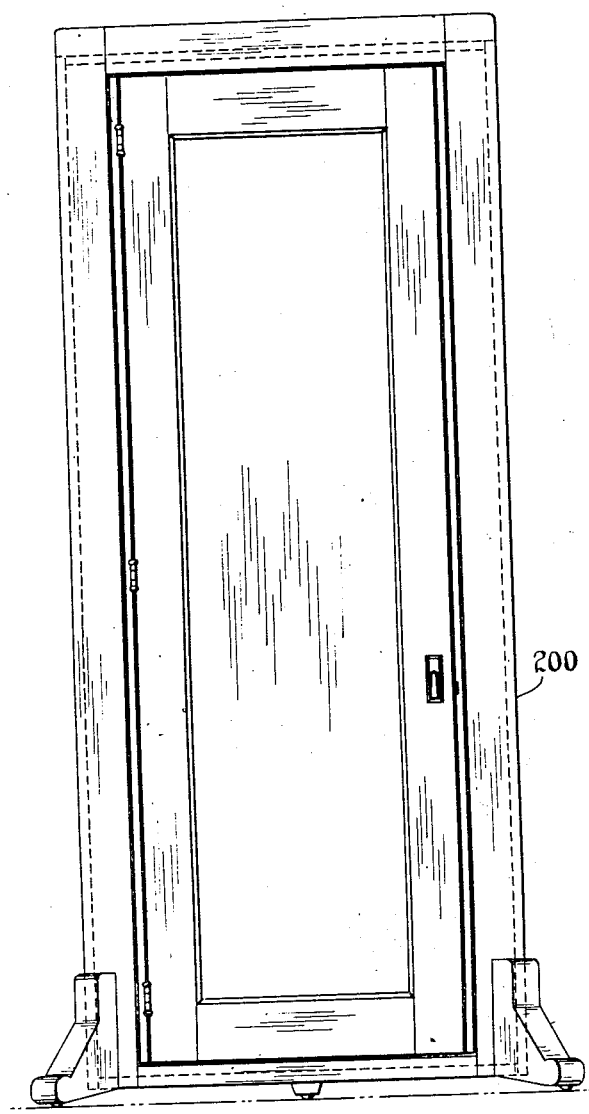
Figure 38 is a front elevation of a modified form of the invention from which the stairway is omitted and which may be a portable cabinet.
Figure 39:
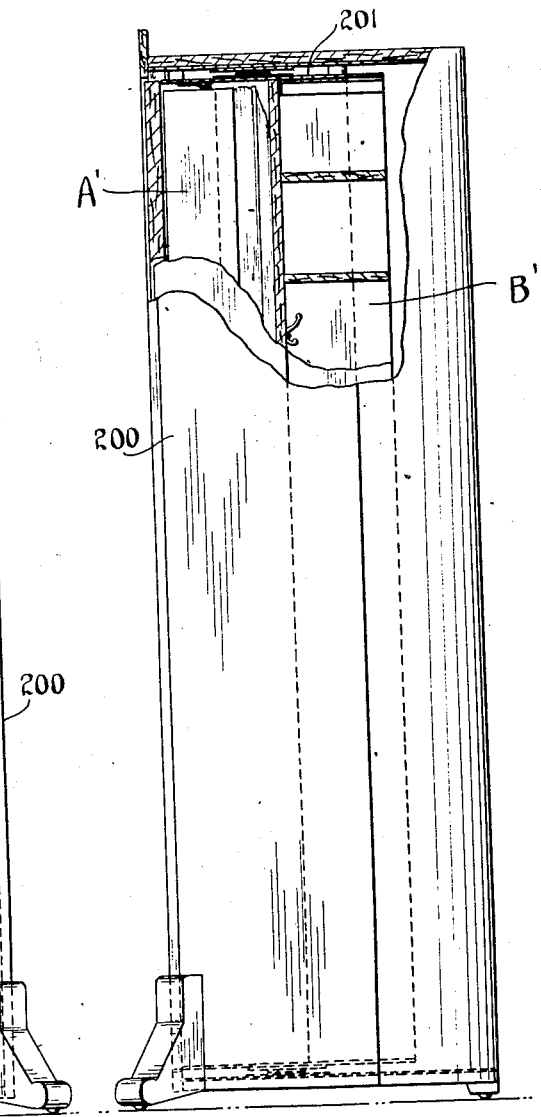
Figure 39 is a side elevation thereof.
Figure 40:
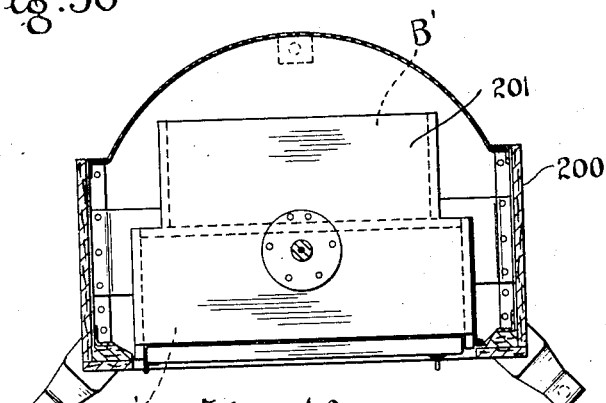
Figure 40 is a sectional plan thereof.

The portable cabinet shown in Figures 38 to 40 embodies certain features of the invention. This cabinet can be used as a piece of furniture in a room. Of course in this form of the invention the stairway cannot be employed.

The body of this cabinet, 200, may have a rotary structure 201 journaled therein similar to the rotary structure of the wall cabinet and having a compartment A' containing the folding bed, table, chairs, etc., or any one or more of these devices.

The compartment B' may be arranged as a closet and may also be provided with suitable supports to receive an ironing board or other household appliances.

Conclusion

It will be apparent from the foregoing that a household appliance cabinet of manifold uses has been provided by the inventions. The rotary structure may be rotated at will therein to present to the front of the cabinet that appliance which it is desired to use.

In either normal position of the rotary structure the table may be drawn out of the cabinet, the folding chairs being removed if desired for use therewith, or the bed may be drawn out of the cabinet, the table being concealed in the bottom of the bed when the latter is extended.

The rotary structure of the wall cabinet can be rotated from its normal position to present the stairway at the front of the cabinet. This also opens the ceiling panel. Whether the stairway is manually or power operated, it is so constructed that the rotary structure and stairway may be operated by a person on the upper floor.

In the portable type of cabinet (which also could be mounted in a wall providing a wall cabinet without a stairway), the bed or table or both can be provided and used as described with the rotary structure in one position. In the other position of the rotary structure, the closet may be used. In this closet different household appliances could be suitably supported or housed.

Obviously many modifications of the invention may be resorted to without departing from the spirit thereof or the scope of the appended claims.

What is claimed is:—

1. The combination with a cabinet, of a collapsible stirway arranged therein comprising an upper stairway section hinged at the top of the cabinet and including a pair of stringers with treads shiftably mounted thereon, and a lower stairway section shiftable between the stringers of the upper section and having means for engaging the treads on the upper section to shift them out of the way when the stair structure is collapsed.

2. The combination with a cabinet, of a collapsible stairway arranged therein comprising an upper stairway section hinged at the top of the cabinet and including a pair of stringers with treads pivotally mounted thereon, and a lower stairway section shiftable between the stringers of the upper section and having means for engaging the treads on the upper section to shift them out of the way when the stair structure is collapsed, said treads having yielding elements thereon to be engaged by said means.

3. The combination with a cabinet, of a collapsible stairway arranged therein including upper and lower sections, one of said sections being movable between the stringers of the other, the treads of said other section being shiftable out of the way by said first section to permit collapsing thereof, and yielding means for cushioning the engagement of the first section of the stairway with the treads.

4. The combination with a cabinet, of a collapsible stairway arranged therein including upper and lower sections, one of said sections being movable between the stringers of the other, the treads of said other section being shiftable out of the way by said first section to permit collapsing thereof.

5. The combination with a wall cabinet of a stairway housed therein, the lower end of the stairway being movable out of the bottom of the cabinet over the floor to extend the same, a track in the bottom of said cabinet for the lower end of the stairway, said track being pivoted intermediate its ends to be depressed downwardly inwardly of the cabinet by the stairway to retain the stairway against accidental displacement, said track being adapted normally to swing downwardly outwardly of the cabinet to facilitate movement of the stairway into the cabinet.

6. The combination as set forth in claim 5, said stairway having a roller supporting it for movement over said track and floor.

7. The combination with a wall cabinet of a stairway comprising telescopic sections received in said cabinet, the upper section of the stairway being pivoted in the upper part of the cabinet and the lower section being movable outwardly from the bottom of the cabinet, a hand rail and posts supporting said hand rail on the sections of said stairway, said posts being pivoted to the stairway sections and pivotally connected with the hand rail, the connection of the hand rail to a post or posts on one section being such that the post or posts may shift relatively of the hand rail, said hand rail being collapsed against the stairway when retracted, means operable by extension of the stairway for extending the hand rail, and means operable by retraction of the stairway for retracting the hand rail.

8. The combination with a wall cabinet, of a stairway received therein, the upper end of which is mounted in the upper end of the cabinet, said stairway being extensible whereby the lower end of the stairway may be moved outwardly of the cabinet over the floor to a position of use in cooperation with a ceiling opening means operable from the floor level above said cabinet for extending said stairway, means operable from the said floor level for retracting said stairway, the first-named means comprising an element adapted to be depressed from above, and an arm connected thereto and to the stairway for swinging the stairway outwardly.

9. The combination with a wall cabinet, of a stairway received therein, the upper end of which is mounted in the upper end of the cabinet, said stairway being extensible whereby the lower end of the stairway may be moved outwardly of the cabinet over the floor to a position of use in cooperation with a ceiling opening, means operable from the floor level above said cabinet for extending said stairway, and means operable from the said floor level for retracting said stairway, the second-named means comprising an element connected to the lower portion of the stairway and shiftable on the upper portion thereof and adapted to be pulled from above.

10. The combination with a wall cabinet, of a stairway received therein, the upper end of which is mounted in the upper end of the cabinet, said stairway being extensible whereby the lower end of the stairway may be moved outwardly of the cabinet over the floor to a position of use in cooperation with a ceiling opening, means operable from the floor level above said cabinet for extending said stairway, means operable from the said floor level for retracting said stairway, the first-named means comprising an element adapted to be depressed from above, and an arm connected thereto and to the stairway for swinging the stairway outwardly, the second-named means comprising an element connected to the lower portion of the stairway and shiftable on the upper portion thereof and adapted to be pulled from above.

11. The combination with a wall cabinet of a rotary structure rotatable about a vertical axis therein to present one side or the other of said structure to the front of said cabinet, an extensible and retractible stair structure on one side of said rotary structure, means operable from the floor above said cabinet to rotate said rotary structure, means also operable from said floor to extend said stairway from the cabinet to a position of use, and means also operable from said floor to retract said stairway.

12. The combination with a wall cabinet of a rotary structure rotatable about a vertical axis therein to present one side or the other of said structure to the front of said cabinet, an extensible and retractible stair structure on one side of said rotary structure, means operable from the floor above said cabinet to rotate said rotary structure, and means also operable from said floor to extend said stairway from the cabinet to a position of use.

13. The combination with a wall cabinet of a rotary structure rotatable about a vertical axis therein to present one side or the other of said structure to the front of said cabinet, an extensible and retractible stair structure on one side of said rotary structure, means operable from the floor above said cabinet to rotate said rotary structure, and means also operable from said floor to extend said stairway from the cabinet to a position of use, said last-named means extending from the upper floor down through the axis of said rotary structure.

14. The combination with a wall cabinet of a rotary structure rotatable about a vertical axis therein to present one side or the other of said structure to the front of said cabinet, an extensible and retractible stair structure on one side of said rotary structure, and means operable from the floor above said cabinet to extend said stairway from the cabinet to a position of use.

15. The combination with a wall cabinet of a rotary structure rotatable about a vertical axis therein to present one side or the other of said structure to the front of said cabinet, an extensible and retractible stair structure on one side of said rotary structure, and means operable from the floor above said cabinet to extend said stairway from the cabinet to a position of use, said means extending from the upper floor down through the axis of said rotary structure.

16. The combination with a wall cabinet of means defining a ceiling opening in association therewith, a rotary structure mounted for rotation about a vertical axis in said cabinet, an extensible and retractible stairway on one side of said rotary structure, a closure for said ceiling opening, means interconnecting said closure and said rotary structure whereby by operation of the rotary structure or of said closure, the rotary structure will be rotated between a position with the stairway at the back of said cabinet and a position with the stairway at the front thereof and the closure will be opened when the stairway is at the front of the cabinet and closed when the stairway is at the back of said cabinet, means operable from the floor above the cabinet for extending the stairway when it is at the front of the cabinet, and means operable from said floor for retracting the stairway.

17. The combination with a wall cabinet of means defining a ceiling opening in association therewith, a rotary structure mounted for rotation about a vertical axis in said cabinet, an extensible and retractible stairway on one side of said rotary structure, a closure for said ceiling opening, means interconnecting said closure and said rotary structure whereby, by operation of the rotary structure or of said closure, the rotary structure will be rotated between a position with the stairway at the back of said cabinet and a position with the stairway at the front thereof and the closure will be opened when the stairway is at the front of the cabinet and closed when the stairway is at the back of said cabinet, and means operable from the floor above the cabinet for extending the stairway when it is at the front of the cabinet.

18. The combination with a wall cabinet of means defining a ceiling opening in association therewith, a rotary structure mounted for rotation about a vertical axis in said cabinet, an extensible and retractible stairway on one side of said rotary structure, a closure for said ceiling opening, and means interconnecting said closure and said rotary structure whereby, by operation of the rotary structure or of said closure, the rotary structure will be rotated between a position with the stairway at the back of said cabinet and a position with the stairway at the front thereof and the closure will be opened when the stairway is at the front of the cabinet and closed when the stairway is at the back of said cabinet.

19. The combination with a wall cabinet of means defining a ceiling opening in association therewith, a rotary structure mounted for rotation about a vertical axis in said cabinet, an extensible and retractible stairway on one side of said rotary structure, a closure for said ceiling opening, means interconnecting said closure and said rotary structure whereby, by operation of the rotary structure or of said closure, the rotary structure will be rotated between a position with the stairway at the back of said cabinet and a position with the stairway at the front thereof and the closure will be opened when the stairway is at the front of the cabinet and closed when the stairway is at the back of said cabinet, and means operable from the floor above the cabinet for extending the stairway when it is at the front of the cabinet, said closure being operable from the floor above said cabinet.

20. The combination with a wall cabinet and means defining a ceiling opening in association therewith, of a rotary structure rotatable about a vertical axis in said cabinet between two positions, a stairway structure supported on said rotary structure for extension and retraction in one position of the rotary structure between a position in the cabinet and a position extending from the cabinet for use in cooperation with said ceiling opening, power operated means for rotating said structure between said two positions and for extending and retracting said stairway, manually operable means for starting the power operated means, and means for stopping said power operated means operable by extension of the stairway to its position of use and by rotation of the rotary structure back to its other position.

21. The combination with a wall cabinet and means defining a ceiling opening in association therewith, of a rotary structure rotatable about a vertical axis in said cabinet between two positions, a stairway structure supported on said rotary structure for extension and retraction in one position of the rotary structure between a position in the cabinet and a position extending from the cabinet for use in cooperation with said ceiling opening, power operated means for rotating said structure between said two positions and for extending and retracting said stairway, manually operable means for starting the power operated means, and means for stopping said power operated means operable by extension of the stairway to its position of use and by rotation of the rotary structure back to its other position, said ceiling opening having a closure and means interconnecting the closure and the rotary structure whereby the closure is opened and closed as the rotary structure is rotated between said two positions.

22. The combination with a wall cabinet and means defining a ceiling opening in association therewith, of a rotary structure rotatable about a vertical axis in said cabinet between two positions, a stairway structure supported on said rotary structure for extension and retraction in one position of the rotary structure between a position in the cabinet and a position extending from the cabinet for use in cooperation with said ceiling opening, power operated means for rotating said structure between said two positions and for extending and retracting said stairway, manually operable means for starting the power operated means, and means for stopping said power operated means operable by extending of the stairway to its position of use and by rotation of the rotary structure back to its other position, said power operated means including a reversible electric motor on the lower end of the stairway, rollers driven thereby, rollers on the rotary structure upon which said stairway rollers rest in the cabinet, means driven by said last-named rollers for rotating the rotary structure, and means for limiting rotation of said rotary structure in said one position whereby said stairway rollers will propel said stairway outwardly of the cabinet off said last-named rollers to extend the stairway, means for stopping the motor and setting it for reverse as the stairway moves into extended position, said stairway rollers being adapted when reversed to propel the stairway back into the cabinet to propel said stairway rollers onto said last-named rollers, and reversely to rotate the rotary structure back to its other position, means for stopping the motor and setting it to reverse in said other position of the rotary structure, and manually operable means for starting the motor in both of the positions in which it is stopped, said manually operable means including a switch at each of lower and upper floors.

23. The combination with a wall cabinet and means defining a ceiling opening in association therewith, of a rotary structure rotatable about a vertical axis in said cabinet between two positions, a stairway structure supported on said rotary structure for extension and retraction in one position of the rotary structure between a position in the cabinet and a position extending from the cabinet for use in cooperation with said ceiling opening, power operated means for rotating said structure between said two positions and for extending and retracting said stairway, manually operable means for starting the power operated means, and means for stopping said power operated means operable by extending of the stairway to its position of use and by rotation of the rotary structure back to its other position, said power operated means including a reversible electric motor on the lower end of the stairway, rollers driven thereby, rollers on the rotary structure upon which said stairway rollers rest in the cabinet, means driven by said last-named rollers for rotating the rotary structure, and means for limiting rotation of said rotary structure in said one position whereby said stairway rollers will propel said stairway outwardly of the cabinet off said last-named rollers to extend the stairway, means for stopping the motor and setting it for reverse as the stairway moves into extended position, said stairway rollers being adapted when reversed to propel the stairway back into the cabinet to propel said stairway rollers onto said last-named rollers, and reversely to rotate the rotary structure back to its other position, means for stopping the motor and setting it to reverse in said other position of the rotary structure, and manually operable means for starting the motor in both of the positions in which it is stopped.

FRANK E. BESSLER.